United States Patent
Peleg et al.

(10) Patent No.: US 7,509,367 B2
(45) Date of Patent: *Mar. 24, 2009

(54) METHOD AND APPARATUS FOR PERFORMING MULTIPLY-ADD OPERATIONS ON PACKED DATA

(75) Inventors: Alexander D. Peleg, Haifa (IL); Millind Mittal, South San Francisco, CA (US); Larry M. Mennemeier, Boulder Creek, CA (US); Benny Eitan, Haifa (IL); Carole Dulong, Saratoga, CA (US); Eiichi Kowashi, Ryugasaki (JP); Wolf Witt, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 1016 days.

This patent is subject to a terminal disclaimer.

(21) Appl. No.: 10/861,167

(22) Filed: Jun. 4, 2004

(65) Prior Publication Data

US 2004/0220992 A1    Nov. 4, 2004

Related U.S. Application Data

(63) Continuation of application No. 08/551,196, filed on Oct. 31, 1995, which is a continuation of application No. 08/522,067, filed on Aug. 31, 1995, now Pat. No. 6,385,634, which is a continuation of application No. 08/521,803, filed on Aug. 31, 1995, now abandoned.

(51) Int. Cl.
    *G06F 7/38*    (2006.01)

(52) U.S. Cl. .................................... 708/524

(58) Field of Classification Search .................. 708/524
    See application file for complete search history.

(56) References Cited

U.S. PATENT DOCUMENTS

| 3,641,736 A | 2/1972 | Dwyer |
| 3,675,001 A | 7/1972 | Singh |
| 3,711,692 A | 1/1973 | Batcher |

(Continued)

FOREIGN PATENT DOCUMENTS

DE        3636106        4/1997

(Continued)

OTHER PUBLICATIONS

International Search Report for PCT/US96/12799, dated Nov. 26, 1996 (1 page).

(Continued)

*Primary Examiner*—Tan V Mai
(74) *Attorney, Agent, or Firm*—Blakely, Sokoloff, Taylor & Zafman LLP

(57) ABSTRACT

A method and apparatus for including in a processor instructions for performing multiply-add operations on packed data. In one embodiment, a processor is coupled to a memory. The memory has stored therein a first packed data and a second packed data. The processor performs operations on data elements in said first packed data and said second packed data to generate a third packed data in response to receiving an instruction. At least two of the data elements in this third packed data storing the result of performing multiply-add operations on data elements in the first and second packed data.

37 Claims, 7 Drawing Sheets

U.S. PATENT DOCUMENTS

| | | | |
|---|---|---|---|
| 3,723,715 A | 3/1973 | Chen et al. |
| 3,900,724 A | 8/1975 | McIver |
| 3,941,990 A | 3/1976 | Rabasse et al. |
| 4,161,784 A | 7/1979 | Cushing et al. |
| 4,344,151 A | 8/1982 | White |
| 4,393,468 A | 7/1983 | New |
| 4,418,383 A | 11/1983 | Doyle et al. |
| 4,498,177 A | 2/1985 | Larson |
| 4,542,476 A | 9/1985 | Nagafuji et al. |
| 4,677,582 A | 6/1987 | Nagafuji |
| 4,707,800 A | 11/1987 | Montrone et al. |
| 4,760,525 A | 7/1988 | Webb |
| 4,760,545 A | 7/1988 | Inagami et al. |
| 4,761,753 A | 8/1988 | Izumisawa |
| 4,771,379 A | 9/1988 | Ando et al. |
| 4,811,269 A | 3/1989 | Hirose et al. |
| 4,876,660 A | 10/1989 | Owen et al. |
| 4,890,218 A | 12/1989 | Bram |
| 4,945,479 A | 7/1990 | Rusterholz et al. |
| 4,956,801 A | 9/1990 | Priem et al. |
| 4,969,118 A | 11/1990 | Montoye et al. |
| 4,972,362 A | 11/1990 | Elkind et al. |
| 4,985,848 A | 1/1991 | Pfeiffer et al. |
| 4,989,168 A | 1/1991 | Kuroda et al. |
| 5,001,662 A | 3/1991 | Baum |
| 5,032,865 A | 7/1991 | Schlunt |
| 5,047,975 A | 9/1991 | Patti et al. |
| 5,081,698 A | 1/1992 | Kohn |
| 5,095,457 A | 3/1992 | Jeong |
| 5,111,422 A | 5/1992 | Ullrich |
| 5,126,964 A | 6/1992 | Zurawski |
| 5,161,247 A | 11/1992 | Murakami et al. |
| 5,187,679 A | 2/1993 | Vassiliadis et al. |
| 5,189,636 A | 2/1993 | Patti et al. |
| 5,193,167 A | 3/1993 | Sites et al. |
| 5,210,711 A | 5/1993 | Rossmere et al. |
| 5,222,037 A | 6/1993 | Taniquchi |
| 5,227,994 A | 7/1993 | Ohki Mitsuharu |
| 5,241,492 A | 8/1993 | Girardeau, Jr. |
| 5,241,493 A | 8/1993 | Chu et al. |
| 5,262,976 A | 11/1993 | Young et al. |
| 5,268,995 A | 12/1993 | Diefendorff et al. |
| 5,293,558 A | 3/1994 | Narita et al. |
| 5,303,355 A | 4/1994 | Gergen et al. |
| 5,311,508 A | 5/1994 | Buda et al. |
| 5,321,644 A | 6/1994 | Schibinger |
| 5,325,320 A | 6/1994 | Chiu |
| 5,327,369 A | 7/1994 | Ashkenazi |
| 5,327,543 A | 7/1994 | Miura et al. |
| 5,390,135 A | 2/1995 | Lee et al. |
| 5,408,581 A | 4/1995 | Suzuki et al. |
| 5,410,670 A | 4/1995 | Hansen et al. |
| 5,420,815 A | 5/1995 | Nix et al. |
| 5,426,598 A | 6/1995 | Hagihara |
| 5,426,783 A | 6/1995 | Norrie et al. |
| 5,442,799 A | 8/1995 | Murakami et al. |
| 5,457,805 A | 10/1995 | Nakamura |
| 5,487,022 A | 1/1996 | Simpson et al. |
| 5,487,159 A | 1/1996 | Byers et al. |
| 5,500,811 A | 3/1996 | Corry |
| 5,506,865 A | 4/1996 | Weaver, Jr. |
| 5,509,129 A | 4/1996 | Guttag et al. |
| 5,515,520 A | 5/1996 | Hatta et al. |
| 5,517,438 A | 5/1996 | Dao-Trong et al. |
| 5,528,529 A | 6/1996 | Seal |
| 5,541,865 A | 7/1996 | Ashkenazi |
| 5,576,983 A | 11/1996 | Shiokawa |
| 5,579,253 A | 11/1996 | Lee et al. |
| 5,590,365 A | 12/1996 | Ide et al. |
| 5,594,679 A | 1/1997 | Iwata |
| 5,606,677 A | 2/1997 | Balmer et al. |
| 5,636,351 A | 6/1997 | Lee |
| 5,642,306 A | 6/1997 | Mennemeir |
| 5,651,121 A | 7/1997 | Davies |
| 5,673,427 A | 9/1997 | Brown et al. |
| 5,680,161 A | 10/1997 | Lehman et al. |
| 5,701,508 A | 12/1997 | Glew et al. |
| 5,721,697 A | 2/1998 | Lee |
| 5,721,892 A | 2/1998 | Peleg et al. |
| 5,734,874 A | 3/1998 | Van Hook et al. |
| 5,742,840 A | 4/1998 | Hansen et al. |
| 5,765,037 A | 6/1998 | Morrison et al. |
| 5,778,419 A | 7/1998 | Hansen et al. |
| 5,793,661 A | 8/1998 | Dulong et al. |
| 5,793,879 A | 8/1998 | Benn et al. |
| 5,794,060 A | 8/1998 | Hansen et al. |
| 5,794,061 A | 8/1998 | Hansen et al. |
| 5,802,336 A | 9/1998 | Peleg et al. |
| 5,805,913 A | 9/1998 | Guttag et al. |
| 5,806,049 A | 9/1998 | Petruzzi |
| 5,809,321 A | 9/1998 | Hansen et al. |
| 5,819,101 A | 10/1998 | Peleg et al. |
| 5,822,603 A | 10/1998 | Hansen et al. |
| 5,835,392 A | 11/1998 | Dulong et al. |
| 5,852,726 A | 12/1998 | Lin et al. |
| 5,859,997 A | 1/1999 | Peleg et al. |
| 5,870,619 A | 2/1999 | Wilkinson et al. |
| 5,880,983 A | 3/1999 | Elliot et al. |
| 5,883,824 A | 3/1999 | Lee et al. |
| 5,884,071 A | 3/1999 | Kosaraju |
| 5,909,552 A | 6/1999 | Jensen et al. |
| 5,936,872 A | 8/1999 | Fischer et al. |
| 5,938,756 A | 8/1999 | Van Hook et al. |
| 5,953,241 A | 9/1999 | Hansen et al. |
| 5,983,256 A | 11/1999 | Peleg et al. |
| 5,983,257 A | 11/1999 | Dulong et al. |
| 6,006,318 A | 12/1999 | Hansen et al. |
| 6,018,351 A | 1/2000 | Mennemeir et al. |
| 6,035,316 A | 3/2000 | Peleg et al. |
| 6,035,387 A | 3/2000 | Hsu et al. |
| 6,041,403 A | 3/2000 | Parker et al. |
| 6,058,408 A | 5/2000 | Fischer et al. |
| 6,122,725 A | 9/2000 | Roussel et al. |
| 6,154,831 A | 11/2000 | Thayer et al. |
| 6,178,482 B1 | 1/2001 | Sollars |
| 6,192,467 B1 | 2/2001 | Abdallah et al. |
| 6,230,253 B1 | 5/2001 | Roussel et al. |
| 6,230,257 B1 | 5/2001 | Roussel et al. |
| 6,233,671 B1 | 5/2001 | Abdallah et al. |
| 6,237,016 B1 | 5/2001 | Fischer et al. |
| 6,260,137 B1 | 7/2001 | Fleck et al. |
| 6,295,599 B1 | 9/2001 | Hansen et al. |
| 6,370,558 B1 | 4/2002 | Guttag et al. |
| 6,378,060 B1 | 4/2002 | Hansen et al. |
| 6,385,634 B1 | 5/2002 | Peleg et al. |
| 6,470,370 B2 | 10/2002 | Fischer et al. |
| 6,502,117 B2 | 12/2002 | Golliver et al. |
| 6,584,482 B1 | 6/2003 | Hansen et al. |
| 6,643,765 B1 | 11/2003 | Hansen et al. |
| 6,725,356 B2 | 4/2004 | Hansen et al. |
| 7,085,795 B2 | 8/2006 | Debes et al. |
| 2002/0059355 A1 | 5/2002 | Peleg et al. |

FOREIGN PATENT DOCUMENTS

| | | |
|---|---|---|
| DE | 19914617 | 10/1999 |
| EP | 0308124 | 3/1989 |
| FR | 2563349 | 10/1985 |
| GB | 2339040 | 12/2000 |
| JP | 3-268024 | 3/1990 |
| JP | 3268024 | 11/1991 |
| JP | 6-266554 | 9/1994 |
| WO | WO 97/08608 | 3/1997 |
| WO | WO 97/22921 | 6/1997 |

| | | |
|---|---|---|
| WO | WO 97/22923 | 6/1997 |
| WO | WO 97/22924 | 6/1997 |
| WO | WO 97/23821 | 7/1997 |
| WO | WO 99/50740 | 10/1999 |

OTHER PUBLICATIONS

J. Shipnes, *Graphics Processing with the 88110 RISC Microprocessor*, IEEE (1992), pp. 169-174.
*MC88110 Second Generation RISC Microprocessor User's Manual*, Motorola Inc. (1991).
*Errata to MC88110 Second Generation RISC Microprocessor User's Manual*, Motorola Inc. (1992) pp. 1-11.
*MC88110 Programmer's Reference Guide*, Morotola Inc. (1992), pp. 1-4.
*i860™ Microprocessor Family Programmer's Reference Manual*, Intel Corporation (1992), Ch. 1, 3, 8, 12.
R.B. Lee, *Accelerating Multimedia With Enhanced Microprocessors*, IEEE Micro (Apr. 1995), pp. 22-32.
*TMS320C2X User's Guide*, Texas Instruments (1993) pp. 3-2 through 3-11; 3-28 through 3-34; 4-1 through 4-22; 4-41; 4-103; 4-119 through 4-120; 4-150 through 4-151.
L. Gwennap, *New PA-RISC Processor Decodes MPEG Video*, Microprocessor Report (Jan. 1994), pp. 16, 17.
SPARC Technology Business, *Ultra SPARC Multimedia Capabilities On-Chip Support for Real-Time Video and Advanced Graphics*, Sun Microsystems (Sep. 1994).
Y. Kawakami et al., *LSI Applications: A Single-Chip Digital Signal Processor for Voiceband Applications*, Solid State Circuits Conference, Digest of Technical Papers; IEEE International (1980).
B. Case, *Philips Hopes to Displace DSPs with VLIW*, Microprocessor Report (Dec. 1994), pp. 12-18.
N. Margulis, *i860™ Microprocessor Architecture*, McGraw Hill, Inc. (1990), Ch. 6, 7, 8, 10, 11.
*Pentium Processor User's Manual, vol. 3: Architecture and Programming Manual*, Intel Corporation (1993), Ch. 1, 3, 4, 6, 8, and 18.
Proceedings; 11th Symposium on Computer Arithmetic, Jun. 29-Jul. 2, 1993, Windsor,Ontario; Edited by Earl Swartzlander Jr., Mary Jane Irwin, Graham Jullien, received Apr. 11, 1993 (pp. 171-178).
*i860™ Microprocessor Family Programmer's Reference Manual*, Intel Corporation (1992), Ch. 2, 9, 10, 11.
Samsung Electronics, "21164 Alpha Microprocessor Data Sheet", 1997.
Silicon Graphics, "Silicon Graphics Introduces Enhanced MIPS Architecture to Lead the Interactive Digital Revolution", Oct. 21, 1996, 2 pages.
Philips Electronics, "TriMedia TM1000 Preliminary Data Book", 1997.
"MIPS Digital Media Extension", pp. C1 to C40.
"MIPS Extension for Digital Media with 3D", MIPS Technologies, Inc. Mar. 12, 1997, pp. 1-26.
"The VIS™ Instruction Set", Sun Microsytsems, Inc. 1997, pp. 1-2.
Abbott et al., "Broadband Algorithms with the MicroUnity Mediaprocessor", Proceedings of COMPCON '96, 1996, pp. 349-354.
Hayes, et al., "MicroUnity Software Development Enviroment", Proceedings of COMPCON '96, 1996, pp. 341-348.
"Silicon Graphics Introduces Compact MIPS@ RISC Microprocessor Code for High Performance at a Low Cost", Oct. 21, 1996, downloaded from the Website webmaster@www.sgi.com, pp. 1-2.
Killian, Earl, "MIPS Extension for Digital Media", Silicon Graphics, pp. 1-10.
"MIPS V Instruction Set", pp. B1 to B7.
Santoro, Mark; Design and Clocking of VLSI Multipliers. Technical Report No. CSL -TR-89-397, Oct. 1989. pp. i-xii and 1-118.
Santoro, Mark, et al.; SPIM: A Pipelined 64X64 bit Interative Multiplier, IEEE Journal of Solid-State Circuits, vol. 24, No. 2, Apr. 1989. pp. 487-493.
Santoro, Mark, et al.; Session II: High-Speed Microprocessor. WAM 2.6: A Pipleined 64X64b Interative Array Multiplier. 1988 IEEE International Solid State Circuits Conference. pp. 36-37 and 290.
BIT Preliminary, Bipolar Integrated Technology, Inc. B3110/B3120;B2110/B2120 Floating Point Chip Set. pp. 1-40.

Eklind, Bob, et al. A SUB 10 nS Bipolar 64 Bit Integrated/Floating Point Processor Implemented On Two Circuits. IEEE 1987 BCTM, pp. 101-104.
Leibowitz, Bob; et al., System Design; ECL gains ground in battle against CMOS. Computer Design; Apr. 1, 1987. pp. 91-95.
IBM. TBD: Double Speed, Single Precision Vector Register Organization Using Double Port Chips. Feb. 1981. pp. 1-6.
Farmwald, P. Michael; High Bandwidth Evaluation of Elementary Functions, S-1 Project. IEEE 1981. pp. 139-142.
Farmwald, P. Michael; On the Design of High Performance Digital Arithmetic Units. UCRL-53190. Aug. 1981. pp. i-vii and 1-95.
Grimes et al.; 64-Bit Processor. The Intel i860 64-Bit Processor: A General-Purpose CPU with 3D Graphics Capabilities. Jul. 1989. pp. 85-94.
Ide, et al.; A 320-MFLOPS CMOS Floating-Point Processing Unit for Superscalar Processors. IEEE Journal of Solid State Circuits, vol. 28, No. 3, Mar. 1993. pp. 352-361.
Lino, et al.; ISSCC 92 Session 6/ Microprocessors/ TA 6.5: A 289MFLOPS Single-Chip Supercomputer. 1992 IEEE International Solid State Circuits Conference. pp. 112-113.
Kohn, et al.; Introducing the Intel i860 64 Bit Microprocessor, Intel Corp. Aug. 1989. pp. 15-30.
Lee, Ruby B.; Accelerating Multimedia with Enhanced Microprocessors. Hewlett-Packard. IEEE Micro, Apr. 1995. pp. 22-32.
Lee, Ruby B.; Realtime MPEG Video via Software Decompression on a PA-RISC Processor. 1995 IEEE, pp. 186-192.
Manferdelli, John L. et al.; Signal Processing Aspects of the S-1 Multiprocessor Project. UCRL-84658. Jul. 28, 1980. pp. 1-8.
Spaderna, D., et al.; An Integrated Floating Point Vector Processor for DSP and Scientific Computing. SHARP Microelectronics Technology Inc. IEEE 1989. pp. 8-13.
Undy, Steve, et al.; A Low-Cost Graphics and Multimedia Workstation Chip Set. Apr. 1994, IEEE micro, pp. 10-22.
"64-Bit and Multimedia Extensions In the PA-RISC 2.0 Architecture", Hewlett Pachard, downloaded from the Website rblee@cup.hp.com.huck@cup.hp.com, pp. 1-8.
"Ultrasparc™ The Visual Instruction Set (VIS™ ): On Chip Support for New-Media Processing", Sun Microsystems, Inc. 1996, pp. 1-7.
Ultrasparc™ and New Media Support Real-Time MPEG2 Decode with the Visual Instruction Set (VIS™ ), Sun Microsystems, 1996, pp. 1-8.
Ultrasparc™ Ultra Port Architecture (UPA): The New-Media System Architecture, Sun Microsystems, Inc. 1996, pp. 1-4.
Ultrasparc™ Turbocharges Network Operations on New Media Computing, Sun Microsystem, Inc., 1996, pp. 1-5.
The Ultrasparc Processor—Technology White Paper, Sun Microsystems, Inc. 1995, 37 pages.
AMD-3D™ Technology Manual, Advanced Micro Devices, Feb. 1998.
Hansen, Craig, Architecture of a Broadband Mediaprocessor, MicroUnity Systems Engineering, Inc., 1996, pp. 334-354.
Levinthal, Adam, et al. Parallel Computers for Graphics Applications, Pixar, San Rafael, CA, 1987, pp. 193-198.
Levinthal, Adam; Porter, Thomas, "Chap-A SIMD Graphics Processor", Computer Graphics Project, Lucasfilm Ltd., 1984, pp. 77-82.
Wang, Mangaser, Shrinivan, A processor Architecture for 3D Graphics Calculations, Computer Motion,Inc., pp. 1-23.
Visual Instruction Set (VIS™), User's Guide, Sun Microsystems, Inc., verison 1.1 Mar. 1997.
Yulun Wang, et al., "The 3DG: A Processor Architecture for Three-Dimensional Applications", Jan. 1992, IEEE, pp. 25-36.
Yulun Wang, et al., "A Processor Architecture for 3D Graphics", Sep. 1999, IEEE Computer Graphics & Applications, pp. 96-105.
"EP96930495", *EPO Search Report*, (Nov. 18, 1999), 2.
U.S. Appl. No. 10/610,831, "Final Office Action", Feb. 28, 2007, 1-7.
U.S. Appl. No. 10/610,831, "Office Action", Aug. 4, 2006, 1-7.
U.S. Appl. No. 10/611,621, "Office Action", Aug. 4, 2006, 1-6.
Complaint, "In the United States District Court for the District of Delaware", *In the matter of Transmeta v. Intel Corporation*, (Oct. 11, 2006), 1-7.
First Amended Complaint, "In the United States District Court for the District of Delaware", *In the matter of Transmeta Corporation v. Intel Corporation*, C.A. No. 06-663 (GMS), (Dec. 12, 2006), 1-8.

Intel Corporation's Answer, AFFI, "In the United States District Court for the District of Delaware", *In the matter of Transmeta Corporation v. Intel Corporation*, Civil Action No. 06-663-GMS, (Jan. 9, 2007), 1-27.

Transmeta, "Transmeta Corporation's Reply to Intel Corporation's Counterclaims to the First Amended Complaint", (Feb. 28, 2007), 1-20.

"Transmeta Corporation's Responses to Intel Corporation's First Set of Interrogatories (Nos. 1-20)", *In the United States District Court for the District of Delaware, In the matter of Transmeta Corporation v Intel Corporation*, (May 21, 2007), 42 pages.

Convex Computer Corporation, "C4/XA Architecture Overview", *Convex Technical Marketing*, Feb. 1994), 279 pages.

Convex Computer Corporation, "Convex C3400 Supercomputer System Overview", *Revision 2.01*, (Jul. 24, 1991), 55 pages.

Convex Computer Corporation, "Saturn Architecture Specification", (Apr. 29, 1993), 88 pages.

Intel Corporation, "Intel 80386 Programmer's Reference Manual", (1986), 421 pages.

Lamport, Leslie, "Multiple Byte Processing With Full-Word Instructions", *ACM*, (1975), pp. 471-475.

Lawrence Livermore Laboratory, "S-1 Uniprocessor Architecture", (Apr. 21, 1983), 386 pages.

Lawrence Livermore Laboratory, "vol. 1: Architecture—The 1979 Annual Report—The S-1 Project", 443 pages.

Lawrence Livermore Laboratory, "vol. II: Architecture—The 1979 Annual Report—The S-1 Project", 366 pages.

Manferdelli, John L. et al., "Signal processing aspects of the S-1 multiprocessor project", *SPIE Vo. 241 Real-Time Signal Processing III*, (Jul. 1980), pp. 224-231.

Texas Instruments, "TMS320C2X User's Guide", (1993), 4:122.

Widdoes Jr., L. C., "The S-1 Project: Developing High-Performance Digital Computers", *IEEE Computer Society*, (Dec. 11, 1979), pp. 1-10.

"Final Joint Claim Construction Chart", *In the United States District Court for the District of Delaware, In the Matter of Transmeta Corporation v. Intel Corporation*, C.A. No. 06-633 (GMS), (Oct. 10, 2007), pp. 1-215.

"Intel Corporation's Opening Claim Construction Brief", *In the United States District Court for the District of Delaware, In the Matter of Transmeta Corporation v. Intel Corporation*, C.A. No. 06-633-GMS, (Oct. 19, 2007), pp. 1-76.

"Intel Corporation's Responses to Transmeta's First Set of Interrogatories to Intel Corporation (Nos. 1-24)", *In the United States District Court for the District of Delaware, In the Matter of Transmeta Corporation v. Intel Corporation*, C.A. No. 06-633-GMS, (May 18, 2007), pp. 1-132.

"Intel Corporation's Supplemental Responses to Transmeta Interrogatory Nos. 8, 9, 12, 19 and 21-23", *In the United States District Court for the District of Delaware, In the Matter of Transmeta Corporation v. Intel Corporation*, C.A. No. 06-633-GMS, (Aug. 23, 2007), pp. 1-27.

"Transmeta Corporation's Amended and Supplemental Responses to Intel Corporation's First Set of Interrogatories (Nos. 1, 3, 4, 5, 8, 13, 15)" (Redacted Version), *In the United States District Court for the District of Delaware, In the Matter of Transmeta Corporation v. Intel Corporation*, C.A. No. 06-633-GMS, (Aug. 23, 2007), 84 pages (including Exhibits 15-18 totaling 46 pages).

"Transmeta Corporation's Opening Claim Construction Brief", *In the United States District Court for the District of Delaware, In the matter of Transmeta Corporation v. Intel Corporation*, C.A. No. 06-633-GMS, (Oct. 19, 2007), pp. 1-66.

Hansen, Craig, "Terpsichore System Architecture", *MicroUnity Systems Engineering, Inc.*, (Aug. 2, 1995), 380 pages.

IBM, Inc., "The PowerPC Architecture", (May 1994), 533 pages.

Margulis, Neal, "i860 Microprocessor Architecture", *McGraw Hill, Inc.*, (1990), Ch. 1-3 (86 pages).

Transmeta Corporation, "Transmeta Announces Settlement of Patent Litigation, Technology Transfer and License Agreement with Intel", *Press Release*, printed from the Internet site (http://investor.transmeta.com/releasedetail.cfm?ReleaseID=271024), (Oct. 24, 2007), one page.

Hansen, Craig, "Terpsichore System Architecture", *MircoUnity Systems Engineering, Inc.*, (Jun. 2, 1995), 368 pages.

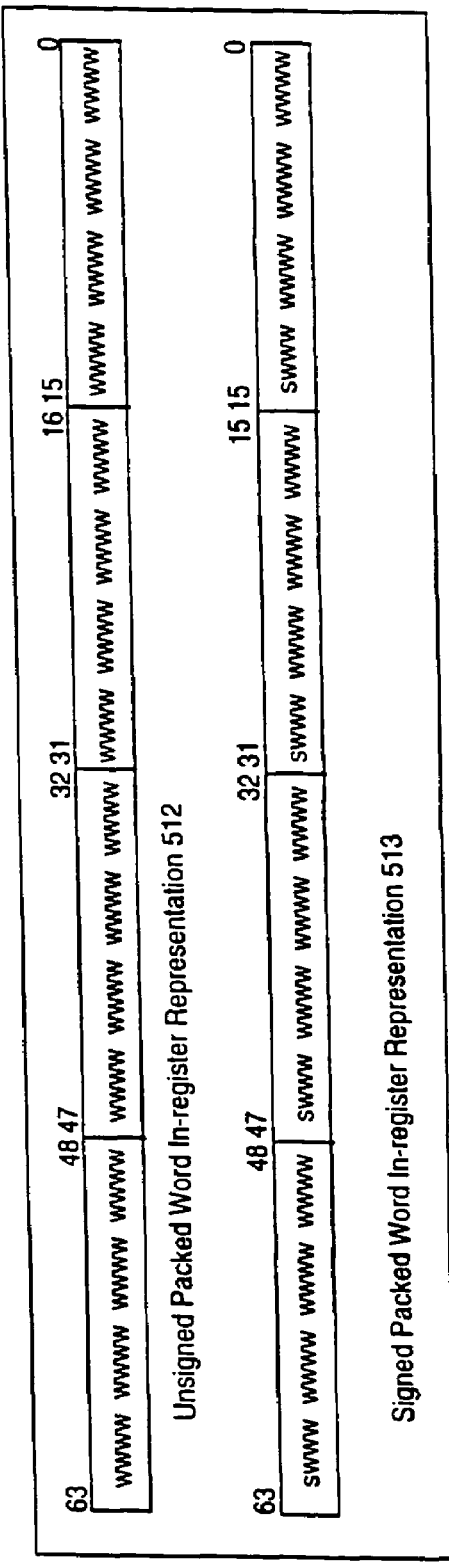
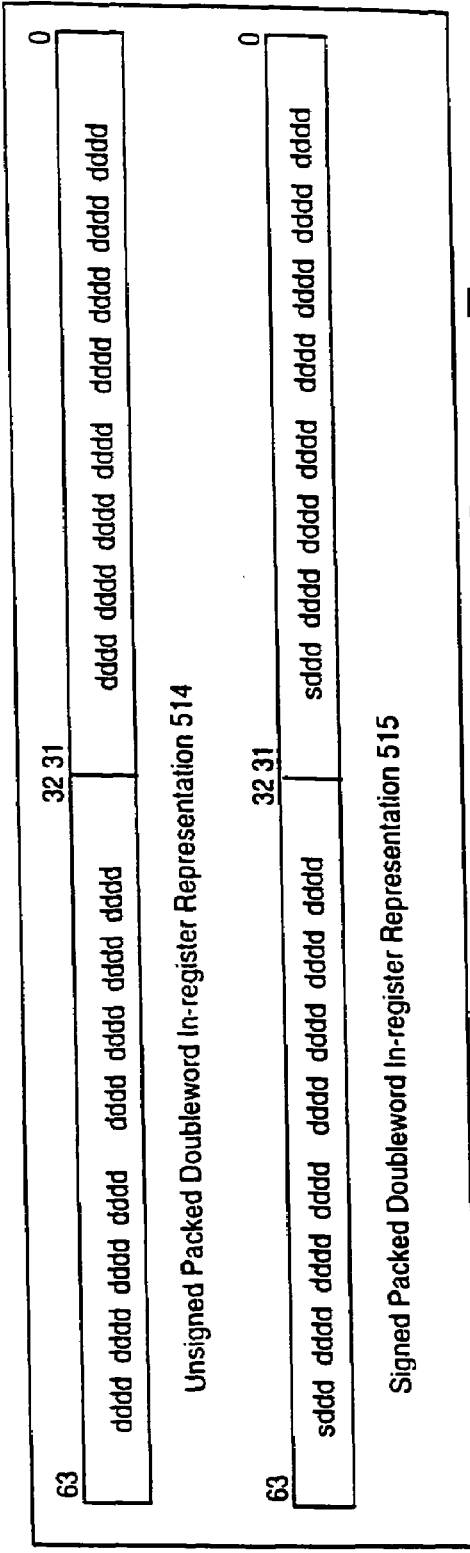

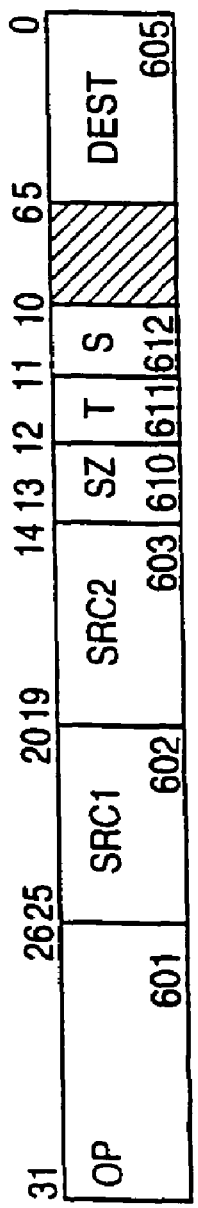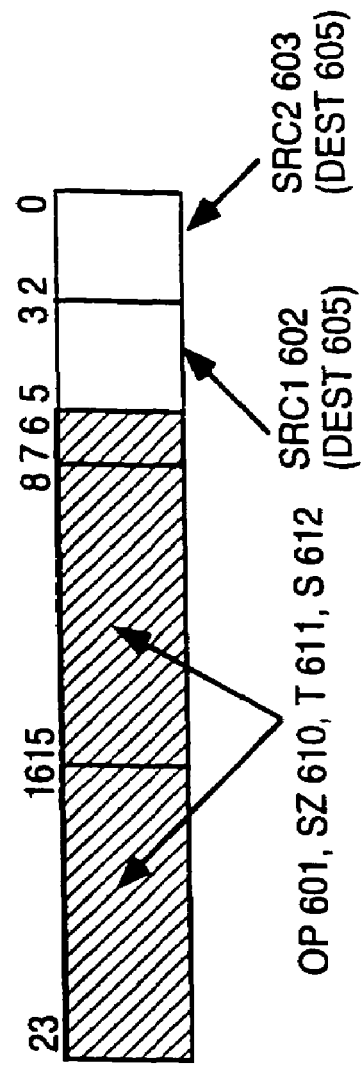

METHOD AND APPARATUS FOR PERFORMING MULTIPLY-ADD OPERATIONS ON PACKED DATA

CROSS-REFERENCE TO RELATED APPLICATION

This is a continuation of application Ser. No. 08/522,067, filed Aug. 31, 1995, now U.S. Pat. No. 6,385,634. This is related to application Ser. No. 08/960,413, titled "Apparatus for Performing Multiply-Add Operations on Packed Data," filed Oct. 29, 1997, now U.S. Pat. No. 5,983,256, which is a Continuation of Ser. No. 08/551,196, filed Oct. 31, 1995, abandoned, which is a Continuation of Ser. No. 08/522,067, filed Aug. 31, 1995, pending. This is related to application Ser. No. 08/606,212, titled "Apparatus for Performing Multiply-Add Operations on Packed Data," filed Feb. 23, 1996, now U.S. Pat. No. 6,035,316, which is a CIP of Ser. No. 08/522,067, filed Aug. 31, 1995, pending. This is related to application Ser. No. 08/554,625, titled "An Apparatus for Performing Multiply-Subtract Operations on Packed Data," filed Nov. 6, 1995, now U.S. Pat. No. 5,721,892, which is a Continuation of Ser. No. 08/521,803, filed Aug. 31, 1995, abandoned.

BACKGROUND OF THE INVENTION

1. Field of Invention

In particular, the invention relates to the field of computer systems. More specifically, the invention relates to the area of packed data operations.

2. Description of Related Art

In typical computer systems, processors are implemented to operate on values represented by a large number of bits (e.g., 64) using instructions that produce one result. For example, the execution of an add instruction will add together a first 64-bit value and a second 64-bit value and store the result as a third 64-bit value. However, multimedia applications (e.g., applications targeted at computer supported cooperation (CSC—the integration of teleconferencing with mixed media data manipulation), 2D/3D graphics, image processing, video compression/decompression, recognition algorithms and audio manipulation) require the manipulation of large amounts of data which may be represented in a small number of bits. For example, graphical data typically requires 8 or 16 bits and sound data typically requires 8 or 16 bits. Each of these multimedia application requires one or more algorithms, each requiring a number of operations. For example, an algorithm may require an add, compare and shift operation.

To improve efficiency of multimedia applications (as well as other applications that have the same characteristics), prior art processors provide packed data formats. A packed data format is one in which the bits typically used to represent a single value are broken into a number of fixed sized data elements, each of which represents a separate value. For example, a 64-bit register may be broken into two 32-bit elements, each of which represents a separate 32-bit value. In addition, these prior art processors provide instructions for separately manipulating each element in these packed data types in parallel. For example, a packed add instruction adds together corresponding data elements from a first packed data and a second packed data. Thus, if a multimedia algorithm requires a loop containing five operations that must be performed on a large number of data elements, it is desirable to pack the data and perform these operations in parallel using packed data instructions. In this manner, these processors can more efficiently process multimedia applications.

However, if the loop of operations contains an operation that cannot be performed by the processor on packed data (i.e., the processor lacks the appropriate instruction), the data will have to be unpacked to perform the operation. For example, if the multimedia algorithm requires an add operation and the previously described packed add instruction is not available, the programmer must unpack both the first packed data and the second packed data (i.e., separate the elements comprising both the first packed data and the second packed data), add the separated elements together individually, and then pack the results into a packed result for further packed processing. The processing time required to perform such packing and unpacking often negates the performance advantage for which packed data formats are provided. Therefore, it is desirable to incorporate in a computer system a set of packed data instructions that provide all the required operations for typical multimedia algorithms. However, due to the limited die area on today's general purpose microprocessors, the number of instructions which may be added is limited. Therefore, it is desirable to invent instructions that provide both versatility (i.e. instructions which may be used in a wide variety of multimedia algorithms) and the greatest performance advantage.

One prior art technique for providing operations for use in multimedia algorithms is to couple a separate digital signaling processor (DSP) to an existing general purpose processor (e.g., The Intel® 486 manufactured by Intel Corporation of Santa Clara, Calif.). The general purpose processor allocates jobs that can be performed using packed data (e.g., video processing) to the DSP.

One such prior art DSP includes a multiply accumulate instruction that adds to an accumulation value the results of multiplying together two values. (see Kawakami, Yuichi, et al., "A Single-Chip Digital Signal Processor for Voiceband Applications", IEEE International Solid-State Circuits Conference, 1980, pp. 40-41). An example of the multiply accumulate operation for this DSP is shown below in Table 1, where the instruction is performed on the data values $A_1$ and $B_1$ accessed as Source1 and Source2, respectively.

TABLE 1

| Multiply-Accumulate Source1, Source2 | |
|---|---|
| $A_1$ | Source1 |
| $B_1$ | Source2 |
| = | |
| $A_1B_1$ + Accumulation Value | Result1 |

One limitation of this prior art instruction is its limited efficiency—i.e., it only operates on 2 values and an accumulation value. For example, to multiply and accumulate two sets of 2 values requires the following 2 instructions performed serially: 1) multiply accumulate the first value from the first set, the first value from the second set, and an accumulation value of zero to generate an intermediate accumulation value; 2) multiply accumulate the second value from the first set, the second value from the second set, and the intermediate accumulation value to generate the result.

Another prior art DSP includes a multiply accumulate instruction that operates on two sets of two values and an accumulation value (See "Digital Signal Processor with Parallel Multipliers", U.S. Pat. No. 4,771,379—referred to herein as the "Ando et al." reference). An example of the multiply accumulate instruction for this DSP is shown below in Table 2, where the instruction is performed on the data values $A_1$, $A_2$, $B_1$ and $B_2$ accessed as Source1-4, respectively.

TABLE 2

| Source1 | | Source3 |
|---|---|---|
| $A_1$ | | $A_2$ |
| | Multiply Accumluate | |
| Source2 | | Source4 |
| $B_1$ | | $B_2$ |
| | = | Result1 |
| | $A_1 \cdot B_1 + A_2 \cdot B_2$ + Accumulation Value | |

Using this prior art technique, two sets of 2 values are multiplied and then added to an accumulation value in one instruction.

This multiply accumulate instruction has limited versatility because it always adds to the accumulation value. As a result, it is difficult to use the instruction for operations other than multiply accumulate. For example, the multiplication of complex numbers is commonly used in multimedia applications. The multiplication of two complex number (e.g., $r_1\ i_1$ and $r_2\ i_2$) is performed according to the following equation:

$$\text{Real Component} = r_1 \cdot r_2 - i_1 \cdot i_2$$

$$\text{Imaginary Component} = r_1 \cdot i_2 + r_2 \cdot i_1$$

This prior art DSP cannot perform the function of multiplying together two complex numbers using one multiply accumulate instruction.

The limitations of this multiply accumulate instruction can be more clearly seen when the result of such a calculation is needed in a subsequent multiplication operation rather than an accumulation. For example, if the real component were calculated using this prior art DSP, the accumulation value would need to be initialized to zero in order to correctly compute the result. Then the accumulation value would again need to be initialized to zero in order to calculate the imaginary component. To perform another complex multiplication on the resulting complex number and a third complex number (e.g., r3, i3), the resulting complex number must be rescaled and stored into the acceptable memory format and the accumulation value must again be initialized to zero. Then, the complex multiplication can be performed as described above. In each of these operations the ALU, which is devoted to the accumulation value, is superfluous hardware and extra instructions are needed to re-initialize this accumulation value. These extra instructions would otherwise have been unnecessary.

A further limitation of this prior art technique is that the data must be accessed through expensive multi-ported memory. This is because the multipliers are connected directly with data memories. Therefore the amount of parallelism which can be exploited is limited to a small number by the cost of the interconnection, and the fact that this interconnection is not decoupled from the instruction.

The Ando, et al. reference also describes that an alternative to this expensive interconnection is to introduce a delay for each subsequent pair of data to be multiplied. This solution diminishes any performance advantages to those provided by the solution previously shown in Table 1.

Furthermore, the notion of multi-ported memory or of pipelined accesses to memory entails the use of multiple addresses. This explicit use of one address per datum, clearly demonstrates that the critical notion of packed data is not employed in this prior art.

BRIEF DESCRIPTION OF THE DRAWINGS

The invention is illustrated by way of example, and not limitation, in the figures. Like references indicate similar elements.

FIG. 5b illustrates in-register packed data representations according to one embodiment of the invention.

FIG. 5c illustrates in-register packed data representations according to one embodiment of the invention.

FIG. 6a illustrates a control signal format for indicating the use of packed data according to one embodiment of the invention.

FIG. 6b illustrates a second control signal format for indicating the use of packed data according to one embodiment of the invention.

DETAILED DESCRIPTION

Figure 1:
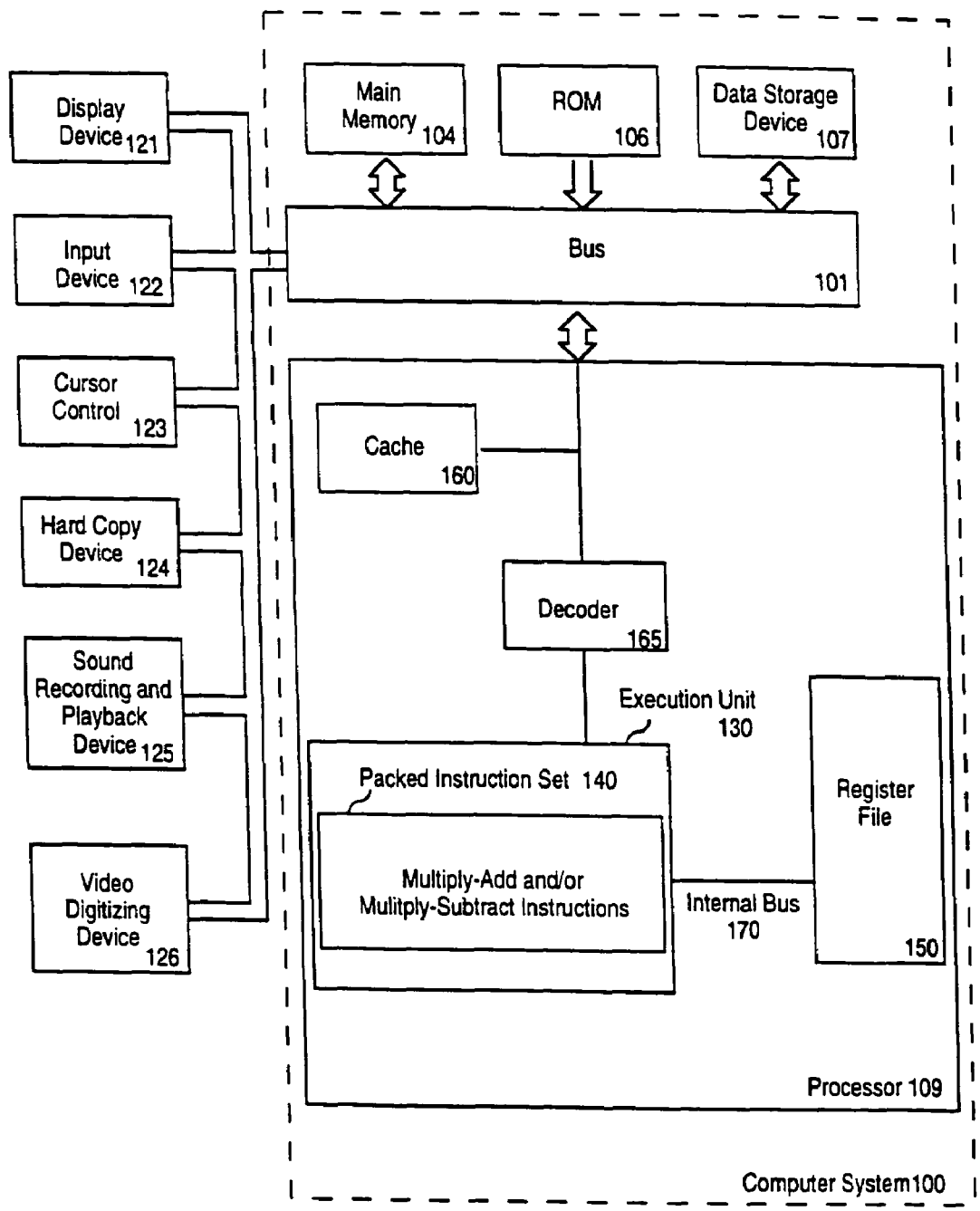
FIG. 1 illustrates an exemplary computer system according to one embodiment of the invention.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

Definitions

To provide a foundation for understanding the description of the embodiments of the invention, the following definitions are provided.

Bit X through Bit Y:
defines a subfield of binary number. For example, bit six through bit zero of the byte $00111010_2$ (shown in base two) represent the subfield $1110102$. The '$_2$' following a binary number indicates base 2. Therefore, $1000_2$ equals $8_{10}$, while $F_{16}$ equals $15_{10}$.

$R_x$: is a register. A register is any device capable of storing and providing data. Further functionality of a register is described below. A register is not necessarily, included on the same die or in the same package as the processor.

SRC1, SRC2, and DEST:
identify storage areas (e.g., memory addresses, registers, etc.)

Source1-i and Result1-i:
represent data.

Overview

This application describes a method and apparatus for including in a processor instructions for performing multiply-add and multiply-subtract operations on packed data. In one embodiment, two multiply-add operations are performed using a single multiply-add instruction as shown below in Table 3a and Table 3b—Table 3a shows a simplified representation of the disclosed multiply-add instruction, while Table 3b shows a bit level example of the disclosed multiply-add instruction.

TABLE 3a

Multiply-Add Source1, Source2

| $A_1$ | $A_2$ | $A_3$ | $A_4$ | Source1 |
|---|---|---|---|---|
| $B_1$ | $B_2$ | $B_3$ | $B_4$ | Source2 |
| | | = | | |
| $A_1B_1 + A_2B_2$ | | $A_3B_3 + A_4B_4$ | | Result1 |

TABLE 3b

| 11111111 11111111 | 11111111 00000000 | 01110001 11000111 | 01110001 11000111 |
|---|---|---|---|
| 3 | 2 | 1 | 0 |
| Multiply | Multiply | Multiply | Multiply |
| 00000000 00000000 | 00000000 00000001 | 10000000 00000000 | 00000100 00000000 |
| ? | ? | ? | ? |
| 32-Bit Intermediate Result 4 | 32-Bit Intermediate Result 3 | 32-Bit Intermediate Result 2 | 32-Bit Intermediate Result 1 |
| Add | | Add | |
| 11111111 11111111 11111111 00000000 | | 11001000 11100011 10011100 00000000 | |
| 1 | | 0 | |

Thus, the described embodiment of the multiple-add instruction multiplies together corresponding 16-bit data elements of Source1 and Source2 generating four 32-bit intermediate results. These 32-bit intermediate results are summed by pairs producing two 32-bit results that are packed into their respective elements of a packed result. As further described later, alternative embodiment may vary the number of bits in the data elements, intermediate results, and results. In addition, alternative embodiment may vary the number of data elements used, the number of intermediate results generated, and the number of data elements in the resulting packed data. The multiply-subtract operation is the same as the multiply-add operation, except the adds are replaced with subtracts. The operation of an example multiply-subtract instruction is shown below in Table 4.

TABLE 4

Multiply-Subtract Source1, Source2

| $A_1$ | $A_2$ | $A_3$ | $A_4$ | Source1 |
|---|---|---|---|---|
| $B_1$ | $B_2$ | $B_3$ | $B_4$ | Source2 |
| | | = | | |
| $A_1B_1 - A_2B_2$ | | $A_3B_3 - A_4B_4$ | | Result1 |

Of course, alternative embodiments may implement variations of these instructions. For example, alternative embodiments may include an instruction which performs at least one multiply-add operation or at least one multiply-subtract operation. As another example, alternative embodiments may include an instruction which performs at least one multiply-add operation in combination with at least one multiply-subtract operation. As another example, alternative embodiments may include an instruction which perform multiply-add operation(s) and/or multiply-subtract operation(s) in combination with some other operation.

Computer System

FIG. 1 illustrates an exemplary computer system 100 according to one embodiment of the invention. Computer system 100 includes a bus 101, or other communications hardware and software, for communicating information, and a processor 109 coupled with bus 101 for processing information. Processor 109 represents a central processing unit of any type of architecture, including a CISC or RISC type architecture. Computer system 100 further includes a random access memory (RAM) or other dynamic storage device (referred to as main memory 104), coupled to bus 101 for storing information and instructions to be executed by processor 109. Main memory 104 also may be used for storing temporary variables or other intermediate information during execution of instructions by processor 109. Computer system 100 also includes a read only memory (ROM) 106, and/or other static storage device, coupled to bus 101 for storing static information and instructions for processor 109. Data storage device 107 is coupled to bus 101 for storing information and instructions.

FIG. 1 also illustrates that processor 109 includes an execution unit 130, a register file 150, a cache 160, a decoder 165, and an internal bus 170. Of course, processor 109 contains additional circuitry which is not necessary to understanding the invention.

Execution unit 130 is used for executing instructions received by processor 109. In addition to recognizing instructions typically implemented in general purpose processors, execution unit 130 recognizes instructions in packed instruction set 140 for performing operations on packed data formats. Packed instruction set 140 includes instructions for supporting multiply-add and/or multiply-subtract operations. In addition, packed instruction set 140 may also include instructions for supporting a pack operation, an unpack operation, a packed add operation, a packed subtract operation, a packed multiply operation, a packed shift operation, a packed compare operation, a population count operation, and a set of packed logical operations (including packed AND, packed ANDNOT, packed OR, and packed XOR) as described in "A Set of Instructions for Operating on Packed Data," filed on Aug. 31, 1995, Ser. No. 08/521,360.

Execution unit 130 is coupled to register file 150 by internal bus 170. Register file 150 represents a storage area on processor 109 for storing information, including data. It is understood that one aspect of the invention is the described instruction set for operating on packed data. According to this aspect of the invention, the storage area used for storing the packed data is not critical. However, one embodiment of the register file 150 is later described with reference to FIG. 2. Execution unit 130 is coupled to cache 160 and decoder 165. Cache 160 is used to cache data and/or control signals from, for example, main memory 104. Decoder 165 is used for decoding instructions received by processor 109 into control signals and/or microcode entry points. In response to these control signals and/or microcode entry points, execution unit 130 performs the appropriate operations. For example, if an add instruction is received, decoder 165 causes execution unit 130 to perform the required addition; if a subtract instruction is received, decoder 165 causes execution unit 130 to perform the required subtraction; etc. Decoder 165 may be implemented using any number of different mechanisms (e.g., a look-up table, a hardware implementation, a PLA, etc.). Thus, while the execution of the various instructions by the decoder and execution unit is represented by a series of if/then statements, it is understood that the execution of an instruction does not require a serial processing of these if/then statements. Rather, any mechanism for logically performing this if/then processing is considered to be within the scope of the invention.

FIG. 1 additionally shows a data storage device 107, such as a magnetic disk or optical disk, and its corresponding disk drive, can be coupled to computer system 100. Computer system 100 can also be coupled via bus 101 to a display device 121 for displaying information to a computer user. Display device 121 can include a frame buffer, specialized graphics rendering devices, a cathode ray tube (CRT), and/or a flat panel display. An alphanumeric input device 122, including alphanumeric and other keys, is typically coupled to bus 101 for communicating information and command selections to processor 109. Another type of user input device is cursor control 123, such as a mouse, a trackball, a pen, a touch screen, or cursor direction keys for communicating direction information and command selections to processor 109, and for controlling cursor movement on display device 121. This input device typically has two degrees of freedom in two axes, a first axis (e.g., x) and a second axis (e.g., y), which allows the device to specify positions in a plane. However, this invention should not be limited to input devices with only two degrees of freedom.

Another device which may be coupled to bus 101 is a hard copy device 124 which may be used for printing instructions, data, or other information on a medium such as paper, film, or similar types of media. Additionally, computer system 100 can be coupled to a device for sound recording, and/or playback 125, such as an audio digitizer coupled to a microphone for recording information. Further, the device may include a speaker which is coupled to a digital to analog (D/A) converter for playing back the digitized sounds.

Also, computer system 100 can be a terminal in a computer network (e.g., a LAN). Computer system 100 would then be a computer subsystem of a computer network. Computer system 100 optionally includes video digitizing device 126.

Video digitizing device 126 can be used to capture video images that can be transmitted to others on the computer network.

In one embodiment, the processor 109 additionally supports an instruction set which is compatible with the x86 instruction set used by existing processors (such as the Pentium® processor) manufactured by Intel Corporation of Santa Clara, Calif. Thus, in one embodiment, processor 109 supports all the operations supported in the IA™—Intel Architecture, as defined by Intel Corporation of Santa Clara, Calif. (see *Microprocessors*, Intel Data Books volume 1 and volume 2, 1992 and 1993, available from Intel of Santa Clara, Calif.). As a result, processor 109 can support existing x86 operations in addition to the operations of the invention. While the invention is described as being incorporated into an x86 based instruction set, alternative embodiments could incorporate the invention into other instruction sets. For example, the invention could be incorporated into a 64-bit processor using a new instruction set.

Figure 2:
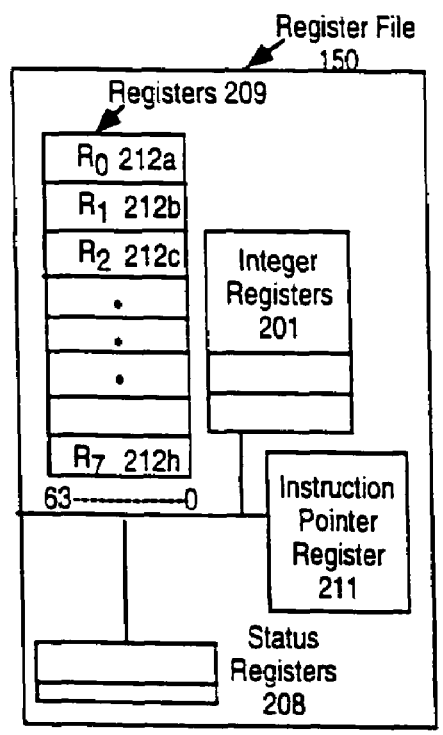
FIG. 2 illustrates a register file of the processor according to one embodiment of the invention.

FIG. 2 illustrates the register file of the processor according to one embodiment of the invention. The register file 150 is used for storing information, including control/status information, integer data, floating point data, and packed data. In the embodiment shown in FIG. 2, the register file 150 includes integer registers 201, registers 209, status registers 208, and instruction pointer register 211. Status registers 208 indicate the status of processor 109. Instruction pointer register 211 stores the address of the next instruction to be executed. Integer registers 201, registers 209, status registers 208, and instruction pointer register 211 are all coupled to internal bus 170. Any additional registers would also be coupled to internal bus 170.

In one embodiment, the registers 209 are used for both packed data and floating point data. In one such embodiment, the processor 109, at any given time, must treat the registers 209 as being either stack referenced floating point registers or non-stack referenced packed data registers. In this embodiment, a mechanism is included to allow the processor 109 to switch between operating on registers 209 as stack referenced floating point registers and non-stack referenced packed data registers. In another such embodiment, the processor 109 may simultaneously operate on registers 209 as non-stack referenced floating point and packed data registers. As another example, in another embodiment, these same registers may be used for storing integer data.

Of course, alternative embodiments may be implemented to contain more or less sets of registers. For example, an alternative embodiment may include a separate set of floating point registers for storing floating point data. As another example, an alternative embodiment may including a first set of registers, each for storing control/status information, and a second set of registers, each capable of storing integer, floating point, and packed data. As a matter of clarity, the registers of an embodiment should not be limited in meaning to a particular type of circuit. Rather, a register of an embodiment need only be capable of storing and providing data, and performing the functions described herein.

The various sets of registers (e.g., the integer registers 201, the registers 209) may be implemented to include different numbers of registers and/or to different size registers. For example, in one embodiment, the integer registers 201 are implemented to store thirty-two bits, while the registers 209 are implemented to store eighty bits (all eighty bits are used for storing floating point data, while only sixty-four bits are used for packed data). In addition, registers 209 contains eight registers, $R_0$ 212a through $R_7$ 212h. $R_1$ 212a, $R_2$ 212b and $R_3$ 212c are examples of individual registers in registers 209.

Thirty-two bits of a register in registers 209 can be moved into an integer register in integer registers 201. Similarly, a value in an integer register can be moved into thirty-two bits of a register in registers 209. In another embodiment, the integer registers 201 each contain 64 bits, and 64 bits of data may be moved between the integer register 201 and the registers 209.

Figure 3:
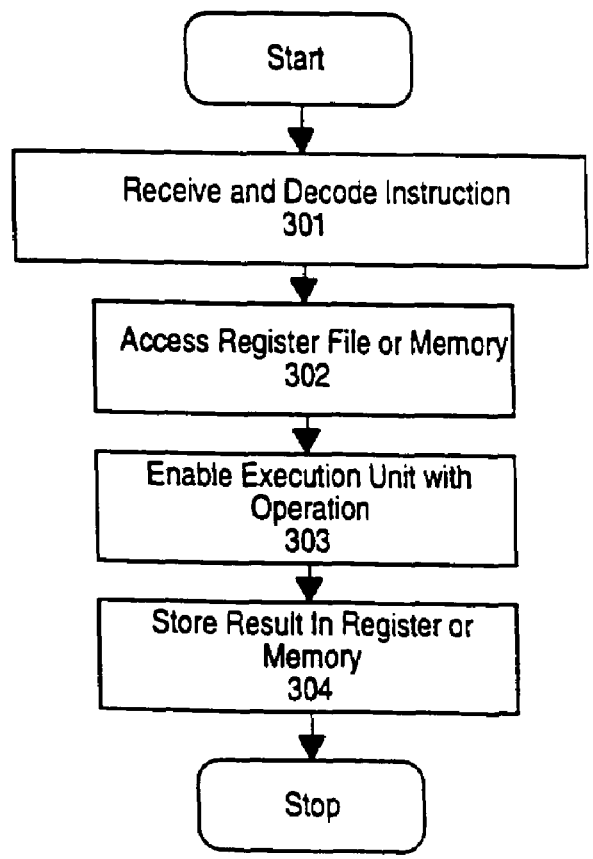
FIG. 3 is a flow diagram illustrating the general steps used by the processor to manipulate data according to one embodiment of the invention.

FIG. 3 is a flow diagram illustrating the general steps are used by the processor to manipulate data according to one embodiment of the invention. That is, FIG. 3 illustrates the steps followed by processor 109 while performing an operation on packed data, performing an operation on unpacked data, or performing some other operation. For example, such operations include a load operation to load a register in register file 150 with data from cache 160, main memory 104, read only memory (ROM) 106, or data storage device 107.

At step 301, the decoder 165 receives a control signal from either the cache 160 or bus 101. Decoder 165 decodes the control signal to determine the operations to be performed.

At step 302, Decoder 165 accesses the register file 150, or a location in memory. Registers in the register file 150, or memory locations in the memory, are accessed depending on the register address specified in the control signal. For example, for an operation on packed data, the control signal can include SRC1, SRC2 and DEST register addresses. SRC1 is the address of the first source register. SRC2 is the address of the second source register. In some cases, the SRC2 address is optional as not all operations require two source addresses. If the SRC2 address is not required for an operation, then only the SRC1 address is used. DEST is the address of the destination register where the result data is stored. In one embodiment, SRC1 or SRC2 is also used as DEST. SRC1, SRC2 and DEST are described more fully in relation to FIG. 6a and FIG. 6b. The data stored in the corresponding registers is referred to as Source1, Source2, and Result respectively. Each of these data is sixty-four bits in length.

In another embodiment of the invention, any one, or all, of SRC1, SRC2 and DEST, can define a memory location in the addressable memory space of processor 109. For example, SRC1 may identify a memory location in main memory 104, while SRC2 identifies a first register in integer registers 201 and DEST identifies a second register in registers 209. For simplicity of the description herein, the invention will be described in relation to accessing the register file 150. However, these accesses could be made to memory instead.

At step 303, execution unit 130 is enabled to perform the operation on the accessed data. At step 304, the result is stored back into register file 150 according to requirements of the control signal.

Data and Storage Formats

Figure 4:
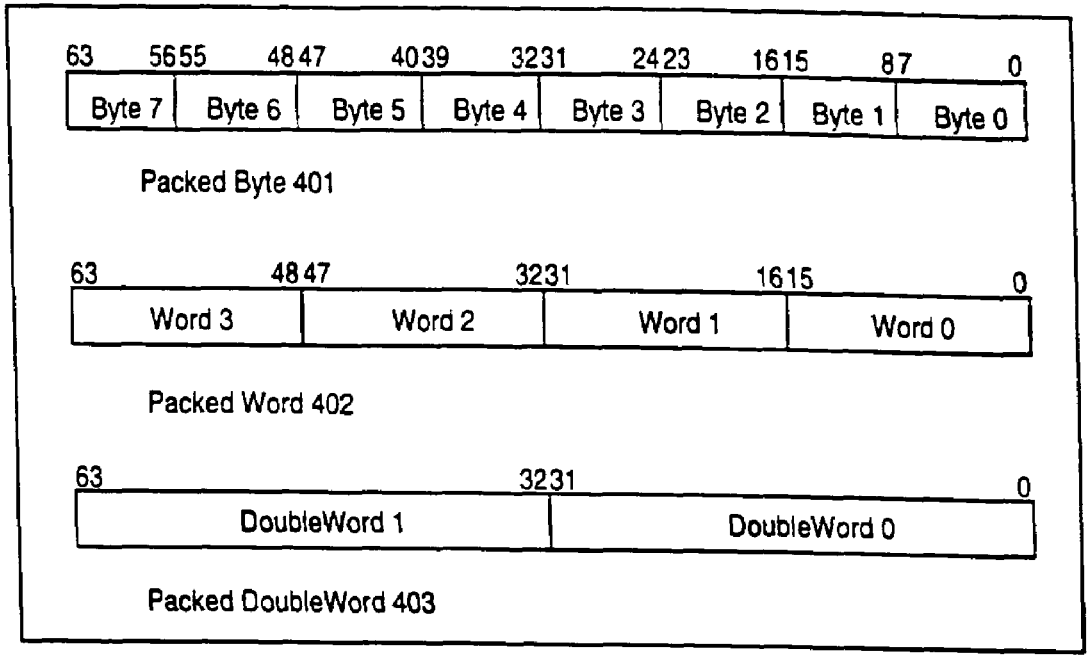
FIG. 4 illustrates packed data-types according to one embodiment of the invention.

FIG. 4 illustrates packed data-types according to one embodiment of the invention. Three packed data formats are illustrated; packed byte 401, packed word 402, and packed doubleword 403. Packed byte, in one embodiment of the invention, is sixty-four bits long containing eight data elements. Each data element is one byte long. Generally, a data element is an individual piece of data that is stored in a single register (or memory location) with other data elements of the same length. In one embodiment of the invention, the number of data elements stored in a register is sixty-four bits divided by the length in bits of a data element.

Packed word 402 is sixty-four bits long and contains four word 402 data elements. Each word 402 data element contains sixteen bits of information.

Packed doubleword 403 is sixty-four bits long and contains two doubleword 403 data elements. Each doubleword 403 data element contains thirty-two bits of information.

Figure 5A:
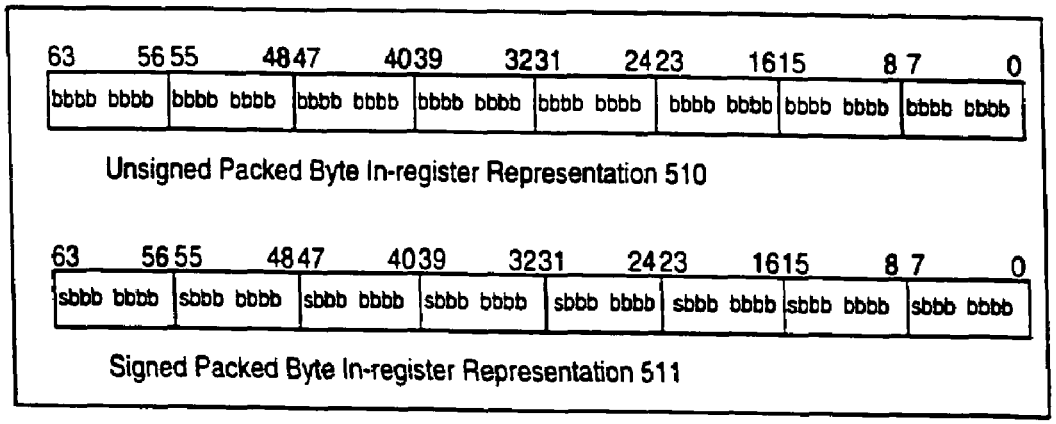
FIG. 5a illustrates in-register packed data representations according to one embodiment of the invention.

FIG. 5a through 5c illustrate the in-register packed data storage representation according to one embodiment of the invention. Unsigned packed byte in-register representation 510 illustrates the storage of an unsigned packed byte 401 in one of the registers $R_0$ 212a through $R_7$ 212h. Information for each byte data element is stored in bit seven through bit zero for byte zero, bit fifteen through bit eight for byte one, bit twenty-three through bit sixteen for byte two, bit thirty-one through bit twenty-four for byte three, bit thirty-nine through bit thirty-two for byte four, bit forty-seven through bit forty for byte five, bit fifty-five through bit forty-eight for byte six and bit sixty-three through bit fifty-six for byte seven. Thus, all available bits are used in the register. This storage arrangement increases the storage efficiency of the processor. As well, with eight data elements accessed, one operation can now be performed on eight data elements simultaneously. Signed packed byte in-register representation 511 illustrates the storage of a signed packed byte 401. Note that the eighth bit of every byte data element is the sign indicator.

Unsigned packed word in-register representation 512 illustrates how word three through word zero are stored in one register of registers 209. Bit fifteen through bit zero contain the data element information for word zero, bit thirty-one through bit sixteen contain the information for data element word one, bit forty-seven through bit thirty-two contain the information for data element word two and bit sixty-three through bit forty-eight contain the information for data element word three. Signed packed word in-register representation 513 is similar to the unsigned packed word in-register representation 512. Note that the sixteenth bit of each word data element is the sign indicator.

Unsigned packed doubleword in-register representation 514 shows how registers 209 store two doubleword data elements. Doubleword zero is stored in bit thirty-one through bit zero of the register. Doubleword one is stored in bit sixty-three through bit thirty-two of the register. Signed packed doubleword in-register representation 515 is similar to unsigned packed doubleword in-register representation 514. Note that the necessary sign bit is the thirty-second bit of the doubleword data element.

As mentioned previously, registers 209 may be used for both packed data and floating point data. In this embodiment of the invention, the individual programming processor 109 may be required to track whether an addressed register, $R_0$ 212a for example, is storing packed data or floating point data. In an alternative embodiment, processor 109 could track the type of data stored in individual registers of registers 209. This alternative embodiment could then generate errors if, for example, a packed addition operation were attempted on floating point data.

Control Signal Formats

The following describes one embodiment of the control signal formats used by processor 109 to manipulate packed data. In one embodiment of the invention, control signals are represented as thirty-two bits. Decoder 165 may receive the control signal from bus 101. In another embodiment, decoder 165 can also receive such control signals from cache 160.

FIG. 6a illustrates a control signal format for indicating the use of packed data according to one embodiment of the invention. Operation field OP 601, bit thirty-one through bit twenty-six, provides information about the operation to be performed by processor 109; for example, packed addition, packed subtraction, etc. SRC1 602, bit twenty-five through twenty, provides the source register address of a register in registers 209. This source register contains the first packed data, Source1, to be used in the execution of the control signal. Similarly, SRC2 603, bit nineteen through bit fourteen, contains the address of a register in registers 209. This second source register contains the packed data, Source2, to be used during execution of the operation. DEST 605, bit five through bit zero, contains the address of a register in registers 209. This destination register will store the result packed data, Result, of the packed data operation.

Control bits SZ 610, bit twelve and bit thirteen, indicates the length of the data elements in the first and second packed data source registers. If SZ 610 equals $01_2$, then the packed data is formatted as packed byte 401. If SZ 610 equals $10_2$, then the packed data is formatted as packed word 402. SZ 610 equaling $00_2$ or $11_2$ is reserved, however, in another embodiment, one of these values could be used to indicate packed doubleword 403.

Control bit T 611, bit eleven, indicates whether the operation is to be carried out with saturate mode. If T 611 equals one, then a saturating operation is performed. If T 611 equals zero, then a non-saturating operation is performed. Saturating operations will be described later.

Control bit S 612, bit ten, indicates the use of a signed operation. If S 612 equals one, then a signed operation is performed. If S 612 equals zero, then an unsigned operation is performed.

FIG. 6b illustrates a second control signal format for indicating the use of packed data according to one embodiment of the invention. This format corresponds with the general integer opcode format described in the "Pentium Processor Family User's Manual," available from Intel Corporation, Literature Sales, P.O. Box 7641, Mt. prospect, Ill., 60056-7641. Note that OP 601, SZ 610, T 611, and S 612 are all combined into one large field. For some control signals, bits three through five are SRC1 602. In one embodiment, where there is a SRC1 602 address, then bits three through five also correspond to DEST 605. In an alternate embodiment, where there is a SRC2 603 address, then bits zero through two also correspond to DEST 605. For other control signals, like a packed shift immediate operation, bits three through five represent an extension to the opcode field. In one embodiment, this extension allows a programmer to include an immediate value with the control signal, such as a shift count value. In one embodiment, the immediate value follows the control signal. This is described in more detail in the "Pentium Processor Family User's Manual," in appendix F, pages F-1 through F-3. Bits zero through two represent SRC2 603. This general format allows register to register, memory to register, register by memory, register by register, register by immediate, register to memory addressing. Also, in one embodiment, this general format can support integer register to register, and register to integer register addressing.

Description of Saturate/Unsaturate

As mentioned previously, T 611 indicates whether operations optionally saturate. Where the result of an operation, with saturate enabled, overflows or underflows the range of the data, the result will be clamped. Clamping means setting the result to a maximum or minimum value should a result exceed the range's maximum or minimum value. In the case of underflow, saturation clamps the result to the lowest value in the range and in the case of overflow, to the highest value. The allowable range for each data format is shown in Table 5.

TABLE 5

| Data Format | Minimum Value | Maximum Value |
|---|---|---|
| Unsigned Byte | 0 | 255 |
| Signed Byte | −128 | 127 |
| Unsigned word | 0 | 65535 |
| Signed word | −32768 | 32767 |
| Unsigned Doubleword | 0 | $2^{64} - 1$ |
| Signed Doubleword | $-2^{63}$ | $2^{63} - 1$ |

As mentioned above, T 611 indicates whether saturating operations are being performed. Therefore, using the unsigned byte data format, if an operation's result=258 and saturation was enabled, then the result would be clamped to 255 before being stored into the operation's destination register. Similarly, if an operation's result=−32999 and processor 109 used signed word data format with saturation enabled, then the result would be clamped to −32768 before being stored into the operation's destination register.

Multiply-Add/Subtract Operation(s)

In one embodiment of the invention, the SRC1 register contains packed data (Source1), the SRC2 register contains packed data (Source2), and the DEST register will contain the result (Result) of performing the multiply-add or multiply-subtract instruction on Source1 and Source2. In the first step of the multiply-add and multiply-subtract instruction, Source1 will have each data element independently multiplied by the respective data element of Source2 to generate a set of respective intermediate results. These intermediate results are summed by pairs to generate the Result for the multiply-add instruction. In contrast, these intermediate results are subtracted by pairs to generate the Result for the multiply-subtract instruction.

In one embodiment of the invention, the multiply-add and multiply-subtract instructions operate on signed packed data and truncate the results to avoid any overflows. In addition, these instructions operate on packed word data and the Result is a packed double word. However, alternative embodiments could support these instructions for other packed data types.

Figure 7:
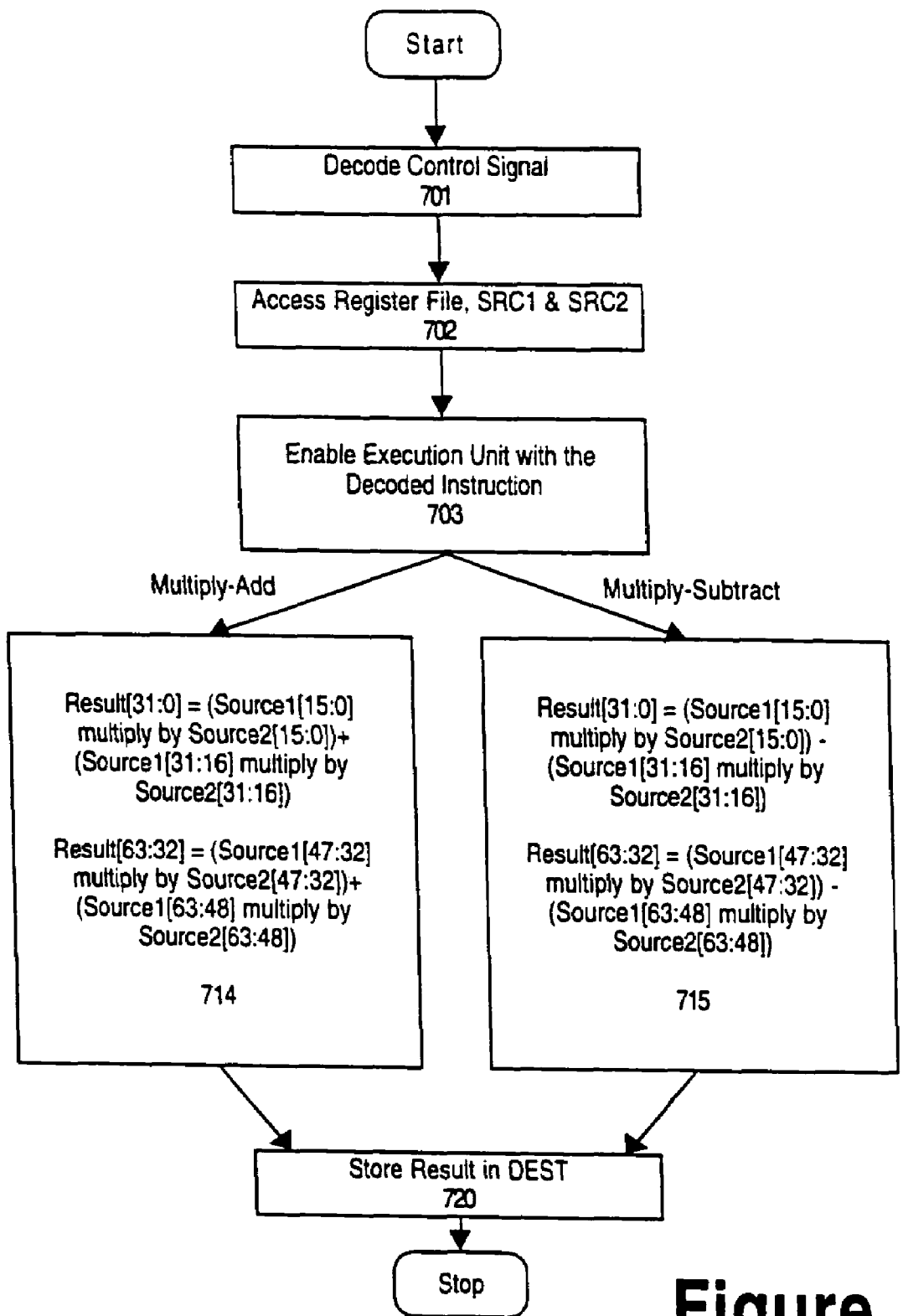
FIG. 7 is a flow diagram illustrating a method for performing multiply-add and multiply-subtract operations on packed data according to one embodiment of the invention.

FIG. 7 is a flow diagram illustrating a method for performing multiply-add and multiply-subtract operations on packed data according to one embodiment of the invention.

At step 701, decoder 165 decodes the control signal received by processor 109. Thus, decoder 165 decodes: the operation code for a multiply-add instruction or a multiply-subtract instruction.

At step 702, via internal bus 170, decoder 165 accesses registers 209 in register file 150 given the SRC1 602 and SRC2 603 addresses. Registers 209 provide execution unit 130 with the packed data stored in the SRC1 602 register (Source1), and the packed data stored in SRC2 603 register (Source2). That is, registers 209 communicate the packed data to execution unit 130 via internal bus 170.

At step 703, decoder 165 enables execution unit 130 to perform the instruction. If the instruction is a multiply-add instruction, flow passes to step 714. However, if the instruction is a multiply-subtract instruction, flow passes to step 715.

In step 714, the following is performed. Source1 bits fifteen through zero are multiplied by Source2 bits fifteen through zero generating a first 32-bit intermediate result (Intermediate Result 1). Source1 bits thirty-one through sixteen are multiplied by Source2 bits thirty-one through sixteen generating a second 32-bit intermediate result (Intermediate Result 2). Source1 bits forty-seven through thirty-two are multiplied by Source2 bits forty-seven through thirty-two generating a third 32-bit intermediate result (Intermediate Result 3). Source1 bits sixty-three through forty-eight are multiplied by Source2 bits sixty-three through forty-eight generating a fourth 32-bit intermediate result (Intermediate Result 4). Intermediate Result 1 is added to Intermediate Result 2 generating Result bits thirty-one through 0, and Intermediate Result 3 is added to Intermediate Result 4 generating Result bits sixty-three through thirty-two.

Step 715 is the same as step 714, with the exception that Intermediate Result 1 Intermediate Result 2 are subtracted to generate bits thirty-one through 0 of the Result, and Intermediate Result 3 and Intermediate Result 4 are subtracted to generate bits sixty-three through thirty-two of the Result.

Different embodiments may perform the multiplies and adds/subtracts serially, in parallel, or in some combination of serial and parallel operations.

At step 720, the Result is stored in the DEST register.

Packed Data Multiply-Add/Subtract Circuits

In one embodiment, the multiply-add and multiply-subtract instructions can execute on multiple data elements in the same number of clock cycles as a single multiply on unpacked data. To achieve execution in the same number of clock cycles, parallelism is used. That is, registers are simultaneously instructed to perform the multiply-add/subtract operations on the data elements. This is discussed in more detail below.

Figure 8:
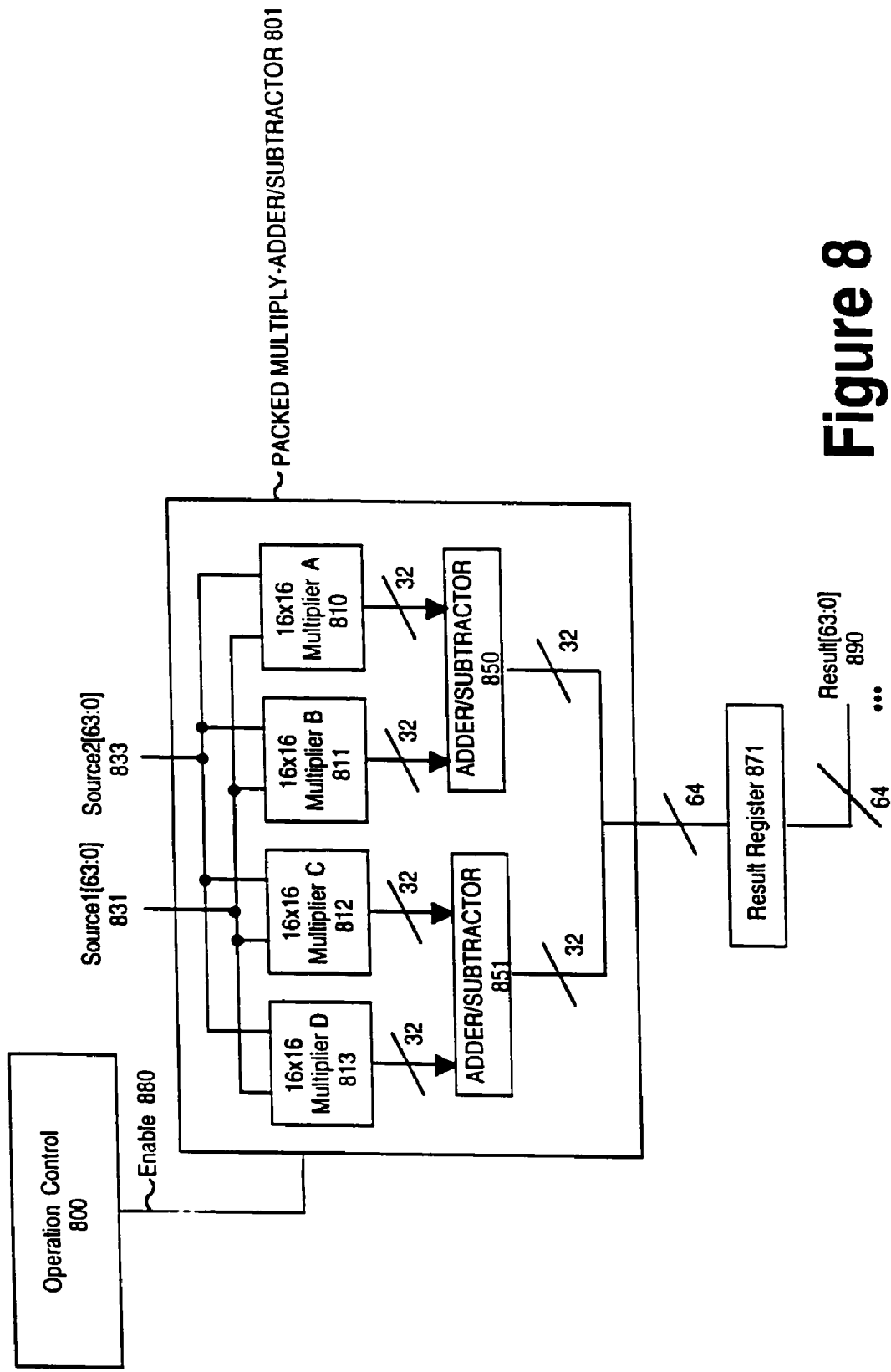
FIG. 8 illustrates a circuit for performing multiply-add and/or multiply-subtract operations on packed data according to one embodiment of the invention.

FIG. 8 illustrates a circuit for performing multiply-add and/or multiply-subtract operations on packed data according to one embodiment of the invention. Operation control 800 processes the control signal for the multiply-add and multiply-subtract instructions. Operation control 800 outputs signals on Enable 880 to control Packed multiply-adder/subtractor 801.

Packed multiply-adder/subtractor 801 has the following inputs: Source1[63:0] 831, Source2[63:0] 833, and Enable 880. Packed multiply-adder/subtractor 801 includes four 16×16 multiplier circuits: 16×16 multiplier A 810, 16×16 multiplier B 811, 16×16 multiplier C 812 and 16×16 multiplier D 813. 16×16 multiplier A 810 has as inputs Source1[15:0] and Source2[15:0]. 16×16 multiplier B 811 has as inputs Source1[31:16] and Source2[31:16]. 16×16 multiplier C 812 has as inputs Source1[47:32] and Source2[47:32]. 16×16 multiplier D 813 has as inputs Source1[63:48] and Source2[63:48]. The 32-bit intermediate results generated by 16×16 multiplier A 810 and 16×16 multiplier B 811 are received by adder/subtractor 1350, while the 32-bit intermediate results generated by 16×16 multiplier C 812 and 16×16 multiplier D 813 are received by adder/subtractor 851.

Based on whether the current instruction is a multiply/add or multiply/subtract instruction, adder/subtractor 850 and adder/subtractor 851 add or subtract their respective 32-bit inputs. The output of adder/subtractor 850 (i.e., Result bits 31 through zero of the Result) and the output of adder/subtractor 851 (i.e., bits 63 through 32 of the Result) are combined into the 64-bit Result and communicated to Result Register 871.

In one embodiment, each of adder/subtractor 851 and adder/subtractor 850 are composed of four 8-bit adders/subtractors with the appropriate propagation delays. However, alternative embodiments could implement adder/subtractor 851 and adder/subtractor 850 in any number of ways (e.g., two 32-bit adders/subtractors).

To perform the equivalent of these multiply-add or multiply-subtract instructions in prior art processors which operate on unpacked data, four separate 64-bit multiply operations and two 64-bit add or subtract operations, as well as the necessary load and store operations, would be needed. This wastes data lines and circuitry that are used for the bits that are higher than bit sixteen for Source1 and Source 2, and higher than bit thirty two for the Result. As well, the entire 64-bit result generated by the prior art processor may not be of use to the programmer. Therefore, the programmer would have to truncate each result.

Performing the equivalent of this multiply-add instruction using the prior art DSP processor described with reference to Table 1 requires one instruction to zero the accumulation value and four multiply accumulate instructions. Performing the equivalent of this multiply-add instruction using the prior art DSP processor described with reference to Table 2 requires one instruction to zero the accumulation value and 2-accumulate instructions.

Advantages of Including the Described Multiply-Add Instruction in the Instruction Set As previously described, the prior art multiply accumulate instructions always add the results of their multiplications to an accumulation value. This accumulation value becomes a bottleneck for performing operations other than multiplying and accumulating (e.g., the accumulation value must be cleared each time a new set of operations is required which do not require the previous accumulation value). This accumulation value also becomes a bottleneck if operations, such as rounding, need to be performed before accumulation.

In contrast, the disclosed multiply-add and multiply-subtract instructions do not carry forward an accumulation value. As a result, these instructions are easier to use in a wider variety of algorithms. In addition, software pipelining can be used to achieve comparable throughput. To illustrate the versatility of the multiply-add instruction, several example multimedia algorithms are described below. Some of these multimedia algorithms use additional packed data instructions. The operation of these additional packed data instructions are shown in relation to the described algorithms. For a further description of these packed data instructions, see "A Set of Instructions for Operating on Packed Data," filed on Aug. 31, 1995, Ser. No. 08/521,360. Of course, other packed data instructions could be used. In addition, a number of steps requiring the use of general purpose processor instructions to manage data movement, looping, and conditional branching have been omitted in the following examples.

1) Multiplication of Complex Numbers

The disclosed multiply-add instruction can be used to multiply two complex numbers in a single instruction as shown in Table 6a. As previously described, the multiplication of two complex number (e.g., $r_1\ i_1$ and $r_2\ i_2$) is performed according to the following equation:

$$\text{Real Component} = r_1 \cdot r_2 - i_1 \cdot i_2$$

$$\text{Imaginary Component} = r_1 \cdot i_2 + r_2 \cdot i_1$$

If this instruction is implemented to be completed every clock cycle, the invention can multiply two complex numbers every clock cycle.

TABLE 6a

Multiply-Add Source1, Source2

| $r_1$ | $i_1$ | $r_1$ | $i_1$ | Source1 |
|---|---|---|---|---|
| $r_2$ | $-i_2$ | $i_2$ | $r_2$ | Source2 |
| = | | | | |
| Real Component: $r_1r_2 - i_1i_2$ | | Imaginary Component: $r_1i_2 + r_2i_1$ | | Result1 |

As another example, Table 6b shows the instructions used to multiply together three complex numbers.

TABLE 6b

Multiply-Add Source1, Source2

| $r_1$ | $i_1$ | $r_1$ | $i_1$ | Source1 |
|---|---|---|---|---|
| $r_2$ | $-i_2$ | $i_2$ | $r_2$ | Source2 |
| = | | | | |
| Real Component$_1$: $r_1r_2 - i_1i_2$ | | Imaginary Component$_1$: $r_1i_2 + r_2i_1$ | | Result1 |

Packed Shift Right Source1, Source2

| Real Component$_1$ | Imaginary Component$_1$ | Result1 |
|---|---|---|
| 16 | | |
| = | | |
| Real Component$_1$ | Imaginary Component$_1$ | Result2 |

Pack Result2, Result2

| Real Component$_1$ | | Imaginary Component$_1$ | | Result2 |
|---|---|---|---|---|
| Real Component$_1$ | | Imaginary Component$_1$ | | Result2 |
| = | | | | |
| Real Component$_1$ | Imaginary Component$_1$ | Real Component$_1$ | Imaginary Component$_1$ | Result3 |

Multiply-Add Result3, Source3

| Real Component$_1$: $r_1r_2 - i_1i_2$ | Imaginary Component$_1$: $r_1i_2 + r_2i_1$ | Real Component$_1$: $r_1r_2 - i_1i_2$ | Imaginary Component$_1$: $r_1i_2 + r_2i_1$ | Result3 |
|---|---|---|---|---|
| $r_3$ | $-i_3$ | $i_3$ | $r_3$ | Source3 |
| = | | | | |
| Real Component$_2$ | | Imaginary Component$_2$ | | Result4 |

2) Multiply Accumulation Operations

The disclosed multiply-add instructions can also be used to multiply and accumulate values. For example, two sets of four data elements ($A_{1-4}$ and $B_{1-4}$) may be multiplied and accumulated as shown below in Table 7. In one embodiment, each of the instruction shown in Table 7 is implemented to complete each clock cycle.

TABLE 7

Multiply-Add Source1, Source2

| 0 | 0 | $A_1$ | $A_2$ | Source1 |
|---|---|---|---|---|
| 0 | 0 | $B_1$ | $B_2$ | Source2 |
| = | | | | |
| 0 | | | $A_1B_1 + A_2B_2$ | Result1 |

Multiply-Add Source3, Source4

| 0 | 0 | $A_3$ | $A_4$ | Source3 |
|---|---|---|---|---|
| 0 | 0 | $B_3$ | $B_4$ | Source4 |
| = | | | | |
| 0 | | | $A_3A_4 + B_3B_4$ | Result2 |

Unpacked Add Source1, Source2

| 0 | $A_1B_1 + A_2B_2$ | Result1 |
|---|---|---|
| 0 | $A_3B_3 + A_4B_4$ | Result2 |
| = | | |
| 0 | $A_1B_1 + A_2B_2 + A_3B_3 + A_4B_4$ | Result3 |

If the number of data elements in each set exceeds 8 and is a multiple of 4, the multiplication and accumulation of these sets requires fewer instructions if performed as shown in table 8 below.

TABLE 8

Multiply-Add Source1, Source2

| $A_1$ | $A_2$ | $A_3$ | $A_4$ | Source1 |
|---|---|---|---|---|
| $B_1$ | $B_2$ | $B_3$ | $B_4$ | Source2 |
| = | | | | |
| $A_1B_1 + A_2B_2$ | | $A_3B_3 + A_4B_4$ | | Result1 |

Multiply-Add Source3, Source4

| $A_5$ | $A_6$ | $A_7$ | $A_8$ | Source3 |
|---|---|---|---|---|
| $B_5$ | $B_6$ | $B_7$ | $B_8$ | Source4 |
| = | | | | |
| $A_5B_5 + A_6B_6$ | | $A_7B_7 + A_8B_8$ | | Result2 |

TABLE 8-continued

Packed Add Result1, Result2

| $A_1B_1 + A_2B_2$ | $A_3B_3 + A_4B_4$ | Result1 |
|---|---|---|
| $A_5B_5 + A_6B_6$ | $A_7B_7 + A_8B_8$ | Result2 |
| = | | |
| $A_1B_1 + A_2B_2 + A_5B_5 + A_6B_6$ | $A_3B_3 + A_4B_4 + A_7B_7 + A_8B_8$ | Result3 |

Unpack High Result3, Source5

| $A_1B_1 + A_2B_2 + A_5B_5 + A_6B_6$ | $A_3B_3 + A_4B_4 + A_7B_7 + A_8B_8$ | Result3 |
|---|---|---|
| 0 | 0 | Source5 |
| = | | |
| 0 | $A_1B_1 + A_2B_2 + A_5B_5 + A_6B_6$ | Result4 |

Unpack Low Result3, Source5

| $A_1B_1 + A_2B_2 + A_5B_5 + A_6B_6$ | $A_3B_3 + A_4B_4 + A_7B_7 + A_8B_8$ | Result3 |
|---|---|---|
| 0 | 0 | Source5 |
| = | | |
| 0 | $A_3B_3 + A_4B_4 + A_7B_7 + A_8B_8$ | Result5 |

Packed Add Result4, Source5

| 0 | $A_1B_1 + A_2B_2 + A_5B_5 + A_6B_6$ | Result4 |
|---|---|---|
| 0 | $A_3B_3 + A_4B_4 + A_7B_7 + A_8B_8$ | Result5 |
| = | | |
| 0 | TOTAL | Result6 |

As another example, Table 9 shows the separate multiplication and accumulation of sets A and B and sets C and D, where each of these sets includes 2 data elements.

TABLE 9

Multiply-Add Source1, Source2

| $A_1$ | $A_2$ | $C_1$ | $C_2$ | Source1 |
|---|---|---|---|---|
| $B_1$ | $B_2$ | $D_1$ | $D_2$ | Source2 |
| = | | | | |
| $A_1B_1 + A_2B_2$ | | $C_1D_1 + C_2D_2$ | | Result1 |

As another example, Table 10 shows the separate multiplication and accumulation of sets A and B and sets C and D, where each of these sets includes 4 data elements.

TABLE 10

Multiply-Add Source1, Source2

| $A_1$ | $A_2$ | $C_1$ | $C_2$ | Source1 |
|---|---|---|---|---|
| $B_1$ | $B_2$ | $D_1$ | $D_2$ | Source2 |
| = | | | | |
| $A_1B_1 + A_2B_2$ | | $C_1D_1 + C_2D_2$ | | Result1 |

Multiply-Add Source3, Source4

| $A_3$ | $A_4$ | $C_3$ | $C_4$ | Source3 |
|---|---|---|---|---|
| $B_3$ | $B_4$ | $D_3$ | $D_4$ | Source4 |
| = | | | | |
| $A_3B_3 + A_4B_4$ | | $C_3D_3 + C_4D_4$ | | Result2 |

Packed Add Result1, Result2

| $A_1B_1 + A_2B_2$ | $C_1D_1 + C_2D_2$ | Result1 |
|---|---|---|
| $A_3B_3 + A_4B_4$ | $C_3D_3 + C_4D_4$ | Result2 |
| = | | |
| $A_1B_1 + A_2B_2 + A_3B_3 + A_4B_4$ | $C_1D_1 + C_2D_2 + C_3D_3 + C_4D_4$ | Result6 |

3) Dot Product Algorithms

Dot product (also termed as inner product) is used in signal processing and matrix operations. For example, dot product is used when computing the product of matrices, digital filtering operations (such as FIR and IIR filtering), and computing correlation sequences. Since many speech compression algorithms (e.g., GSM, G.728, CELP, and VSELP) and Hi-Fi compression algorithms (e.g., MPEG and subband coding) make extensive use of digital filtering and correlation computations, increasing the performance of dot product increases the performance of these algorithms.

The dot product of two length N sequences A and B is defined as:

$$Result = \sum_{i=0}^{N-1} Ai \cdot Bi$$

Performing a dot product calculation makes extensive use of the multiply accumulate operation where corresponding elements of each of the sequences are multiplied together, and the results are accumulated to form the dot product result.

The dot product calculation can be performed using the multiply-add instruction. For example if the packed data type containing four sixteen-bit elements is used, the dot product calculation may be performed on two sequences each containing four values by:

1) accessing the four sixteen-bit values from the A sequence to generate Source1 using a move instruction;
2) accessing four sixteen-bit values from the B sequence to generate Source2 using a move instruction; and
3) performing multiplying and accumulating as previously described using a multiply-add, packed add, and shift instructions.

For vectors with more than just a few elements the method shown in Table 10 is used and the final results are added together at the end. Other supporting instructions include the packed OR and XOR instructions for initializing the accumulator register, the packed shift instruction for shifting off unwanted values at the final stage of computation. Loop control operations are accomplished using instructions already existing in the instruction set of processor 109.

4) Discrete Cosign Transform Algorithms

Discrete Cosine Transform (DCT) is a well known function used in many signal processing algorithms. Video and image compression algorithms, in particular, make extensive use of this transform.

In image and video compression algorithms, DCT is used to transform a block of pixels from the spatial representation to the frequency representation. In the frequency representation, the picture information is divided into frequency components, some of which are more important than others. The compression algorithm selectively quantizes or discards the frequency components that do not adversely affect the reconstructed picture contents. In this manner, compression is achieved.

There are many implementations of the DCT, the most popular being some kind of fast transform method modeled based on the Fast Fourier Transform (FFT) computation flow. In the fast transform, an order N transform is broken down to a combination of order N/2 transforms and the result recombined. This decomposition can be carried out until the smallest order 2 transform is reached. This elementary 2 transform kernel is often referred to as the butterfly operation. The butterfly operation is expressed as follows:

$$X=a*x+b*y$$

$$Y=c*x-d*y$$

where a, b, c and d are termed the coefficients, x and y are the input data, and X and Y are the transform output.

The multiply-add allows the DCT calculation to be performed using packed data in the following manner:

1) accessing the two 16-bit values representing x and y to generate Source1 (see Table 11 below) using the move and unpack instructions;
2) generating Source2 as shown in Table 11 below—Note that Source2 may be reused over a number of butterfly operations; and
3) performing a multiply-add instruction using Source1 and Source2 to generate the Result (see Table 11 below).

TABLE 11

| x | y | x | y | Source1 |
|---|---|---|---|---|
| a | b | c | -d | Source2 |
| a·x+b·y | | c·x-d·y | | Source3 |

In some situations, the coefficients of the butterfly operation are 1. For these cases, the butterfly operation degenerates into just adds and subtracts that may be performed using the packed add and packed subtract instructions.

An IEEE document specifies the accuracy with which inverse DCT should be performed for video conferencing. (See, IEEE Circuits and Systems Society, "IEEE Standard Specifications for the Implementations of 8×8 Inverse Discrete Cosine Transform," IEEE Std. 1180-1990, IEEE Inc. 345 East 47th St., NY, N.Y. 10017, USA, Mar. 18, 1991). The required accuracy is met by the disclosed multiply-add instruction because it uses 16-bit inputs to generate 32-bit outputs.

In this manner, the described multiply-add instruction can be used to improve the performance of a number of different algorithms, including algorithms that require the multiplication of complex numbers, algorithms that require transforms, and algorithms that require multiply accumulate operations. As a result, this multiply-add instruction can be used in a general purpose processor to improve the performance of a greater number algorithms than the described prior art instructions.

ALTERNATIVE EMBODIMENTS

While the described embodiment uses 16-bit data elements to generate 32-bit data elements, alternative embodiments could use different sized inputs to generate different sized outputs. In addition, while in the described embodiment Source1 and Source 2 each contain 4 data elements and the multiply-add instruction performs two multiply-add operations, alternative embodiment could operate on packed data having more or less data elements. For example, one alternative embodiment operates on packed data having 8 data elements using 4 multiply-adds generating a resulting packed data having 4 data elements. While in the described embodiment each multiply-add operation operates on 4 data elements by performing 2 multiplies and 1 addition, alternative embodiments could be implemented to operate on more or less data elements using more or less multiplies and additions. As an example, one alternative embodiment operates on 8 data elements using 4 multiplies (one for each pair of data elements) and 3 additions (2 additions to add the results of the 4 multiplies and 1 addition to add the results of the 2 previous additions).

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A computer-implemented method comprising:
receiving an instruction that specifies locations of a first packed data having a first plurality of data elements and a second packed data having a second plurality of data elements, each of the data elements of the first packed data corresponding to a different data element of the second packed data;
generating a packed data result in response to the instruction, the packed data result having a plurality of result data elements, each of the result data elements comprising a sum of products of corresponding data elements of the first and second packed data; and
storing the packed data result.

2. The method of claim 1, wherein said storing comprises storing the packed data result over one of the first packed data and the second packed data.

3. The method of claim 1, wherein the result data elements each have higher precision that the data elements of the first packed data.

4. The method of claim 3, wherein the data elements of the first and second packed data comprise packed word data elements, and wherein the result data elements comprise packed double word data elements.

5. The method of claim 1, further comprising completing said executing the instruction without summing the plurality of result data elements.

6. The method of claim 1, further comprising:
accessing the second packed data from a location specified by bits zero through two of the instruction;
accessing the first packed data from a location specified by bits three through five of the instruction; and
wherein said storing comprises storing the packed data result in a destination specified by said bits three through five of the instruction.

7. The method of claim 1, wherein said receiving comprises receiving an instruction having an instruction format selected from a 24-bit instruction format and a 32-bit instruction format.

8. The method of claim 1, wherein each of the first and second packed data comprises a unit of data that consists of a plurality of data elements of the same size.

9. The method of claim 1, wherein each of the first and second packed data comprises a unit of data that is not fully populated with a plurality of data elements of the same size.

10. The apparatus of claim 9, wherein a size in bits of a register representing a location of the first packed data is greater than a size in bits of the first packed data.

11. The method of claim 1, wherein each of the first and second packed data comprises a unit of data that is fully populated with a plurality of data elements of the same size.

12. An apparatus comprising:
a decoder to receive and decode an instruction that specifies locations of a first packed data having a first plurality of data elements and a second packed data having a second plurality of data elements, each of the data elements of the first packed data corresponding to a different data element of the second packed data; and
an execution unit in communication with the decoder to generate a packed data result, after the decoder decodes the instruction, by performing multiplications and additions, the packed data result having a plurality of result data elements, each of the result data elements comprising a sum of products of corresponding data elements of the first and second packed data.

13. The apparatus of claim 12, wherein the execution unit is to store the packed data result over one of the first packed data and the second packed data.

14. The apparatus of claim 12, wherein the execution unit is to generate result data elements that have higher precision that the data elements of the first packed data.

15. The apparatus of claim 12, wherein the execution unit is to complete execution of the instruction without summing the plurality of result data elements.

16. The apparatus of claim 12, wherein the decoder is to decode an instruction having a 24-bit instruction format, wherein bits zero through two of the instruction specify a location of the second packed data, and wherein bits three through five of the instruction specify a location of the first packed data.

17. The apparatus of claim 12, wherein the execution unit comprises circuitry.

18. The apparatus of claim 12, wherein the decoder comprises circuitry.

19. The apparatus of claim 12, further comprising an audio device to provide one or more data elements.

20. The apparatus of claim 12, wherein each of the first and second packed data comprises a unit of data that consists of a plurality of data elements of the same size.

21. The apparatus of claim 12, wherein each of the first and second packed data comprises a unit of data that is not fully populated with a plurality of data elements of the same size.

22. The apparatus of claim 21, wherein a size in bits of a register representing a location of the first packed data is greater than a size in bits of the first packed data.

23. The apparatus of claim 12, wherein each of the first and second packed data comprises a unit of data that is fully populated with a plurality of data elements of the same size.

24. A system comprising:
a memory to store a first packed data having a first plurality of data elements and a second packed data having a second plurality of data elements, each of the data elements of the first packed data corresponding to a different data element of the second packed data;
a processor coupled with the memory, the processor to generate a packed data result in response to a single instruction that specifics locations of the first and second packed data, the packed data result having a plurality of result data elements, each of the result data elements comprising a sum of products of corresponding data elements of the first and second packed data; and
a device selected from a device to record sound and a device to playback sound, the device operatively coupled with the memory, the device to provide one or more data elements to the memory.

25. The system of claim 24, wherein the processor is to store the packed data result over one of the first packed data and the second packed data.

26. The system of claim 24, wherein the processor is to complete execution of the instruction without summing the plurality of result data elements.

27. The system of claim 24, wherein the processor is to decode the instruction having a 24-bit instruction format, wherein bits zero through two of the instruction specify a location of the second packed data, and wherein bits three through five of the instruction specify a location of the first packed data.

28. In a computer system, a method comprising:
receiving an instruction that specifies locations of a first packed data having a first plurality of data elements and a second packed data having a second plurality of data elements, each of the data elements of the first packed data corresponding to a different data element of the second packed data;
generating a packed data result in response to the instruction, the packed data result having a plurality of result data elements, at least one of the result data elements comprising a sum of products of corresponding data elements, and at least one of the result data elements comprising a difference of products of corresponding data elements; and
storing the packed data result.

29. The method of claim 28, wherein said storing comprises storing the packed data result over one of the first packed data and the second packed data.

30. The method of claim 28, wherein the result data elements each have higher precision that the data elements of the first packed data.

31. The method of claim 30, wherein the data elements of the first and second packed data comprise packed word data elements, and wherein the result data elements comprise packed double word data elements.

32. The method of claim 28, further comprising completing said executing the instruction without summing the plurality of result data elements.

33. The method of claim 28, further comprising:
accessing the second packed data from a location specified by bits zero through two of the instruction;

accessing the first packed data front a location specified by bits three through five of the instruction; and wherein said storing comprises storing the packed data result in a destination specified by said bits three through five of the instruction.

34. The method of claim 28, wherein said receiving comprises receiving an instruction having an instruction format selected from a 24-bit instruction format and a 32-bit instruction format.

35. A computer-implemented method comprising:

receiving an instruction that specifies locations of a first packed data having a first plurality of data elements and a second packed data having a second plurality of data elements, each of the data elements of the first packed data corresponding to a different data element of the second packed data;

generating a packed data result in response to the instruction, the packed data result comprising four result data elements, each of the four result data elements comprising a sum of four products of corresponding data elements of the first and second packed data; and storing the packed data result.

36. The method of claim 35, wherein the result data elements arc 32-bit data elements.

37. The method of claim 35, wherein pairs of the corresponding data elements are grouped into sets of four.

* * * * *

UNITED STATES PATENT AND TRADEMARK OFFICE
CERTIFICATE OF CORRECTION

| | | |
|---|---|---|
| PATENT NO. | : 7,509,367 B2 | Page 1 of 1 |
| APPLICATION NO. | : 10/861167 | |
| DATED | : March 24, 2009 | |
| INVENTOR(S) | : Alexander D. Peleg | |

It is certified that error appears in the above-identified patent and that said Letters Patent is hereby corrected as shown below:

On the Title Page, in Item [63], under Related U.S. Application Data, at lines 1-2, delete "08/551,196, filed on Oct. 31, 1995", and insert -- 09/989,736, filed on Nov. 19, 2001 --.

On the Title Page, in Item [63], under Related U.S. Application Data, at lines 4-5, delete ", which is a continuation of application No. 08/521,803, filed on Aug. 31 1995, abandoned".

Column 1, line 8, after "This is a continuation of", insert -- application Ser. No. 09/989.736, filed 11/19/2001, which is a continuation of --.

Column 1, line 15, delete "pending", and insert -- now U.S. Patent 6,385,634 --.

Column 1, line 19, delete "pending", and insert -- now U.S. Patent 6,385,634 --.

Signed and Sealed this

Tenth Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,509,367 B2 Page 1 of 1
APPLICATION NO. : 10/861167
DATED : March 24, 2009
INVENTOR(S) : Peleg et al.

It is certified that error appears in the above-identified patent and that said Letters Patent is hereby corrected as shown below:

In column 23, at line 1 delete, "front" and insert --from--.

In column 24, at line 11 delete, "arc" and insert --are--.

Signed and Sealed this

Twelfth Day of October, 2010

David J. Kappos
*Director of the United States Patent and Trademark Office*